United States Patent
Todd et al.

(10) Patent No.: US 9,601,149 B1
(45) Date of Patent: Mar. 21, 2017

(54) MEDIA LIBRARY INCLUDING STORAGE MEDIA RETRIEVAL ASSEMBLY

(71) Applicant: Quantum Corporation, San Jose, CA (US)

(72) Inventors: Christian A. Todd, Parker, CO (US); Alexander Hois, Centennial, CO (US); David Tindall, III, Parker, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 14/860,278

(22) Filed: Sep. 21, 2015

(51) Int. Cl.
  *G11B 15/68* (2006.01)
  *G11B 17/22* (2006.01)

(52) U.S. Cl.
  CPC ........ *G11B 15/6835* (2013.01); *G11B 17/225* (2013.01)

(58) Field of Classification Search
  CPC .......................... G11B 15/6835; G11B 17/225
  See application file for complete search history.

(56) References Cited

U.S. PATENT DOCUMENTS

| | | | | |
|---|---|---|---|---|
| 4,654,727 A * | 3/1987 | Blum | ................ | G11B 15/6835 194/906 |
| 5,002,449 A * | 3/1991 | Kita | ..................... | B65G 1/0492 414/273 |
| 5,015,139 A * | 5/1991 | Baur | ..................... | B23Q 7/043 294/104 |
| 6,421,306 B1 * | 7/2002 | Luffel | ................ | G11B 15/6835 360/92.1 |
| 6,498,771 B1 * | 12/2002 | Boyce | ................ | G11B 15/6835 360/92.1 |
| 6,515,822 B1 * | 2/2003 | White | .................. | G11B 17/225 360/92.1 |
| 6,570,734 B2 * | 5/2003 | Ostwald | ............ | G11B 15/6835 360/92.1 |
| 6,693,758 B2 * | 2/2004 | Patterson | ........... | G11B 15/6885 360/69 |
| 6,829,116 B1 * | 12/2004 | Owens | ............... | G11B 15/6885 360/69 |
| 7,016,144 B2 * | 3/2006 | Yamakawa | .......... | G11B 17/225 360/92.1 |
| 7,184,242 B1 * | 2/2007 | Ostwald | ............... | G11B 15/683 360/92.1 |

(Continued)

*Primary Examiner* — Thomas Randazzo
(74) *Attorney, Agent, or Firm* — Roeder & Broder LLP; James P. Broder

(57) ABSTRACT

A retrieval assembly (22) for moving storage media (16) within a media library (10), the media library (10) including a rack assembly (20) having a first rack (20A) and a spaced apart second rack (20B), comprises a picker system (32), an assembly base (30), a first mover (28A), a second mover (28B), and a control system (26). The picker system (32) selectively engages the storage media (16). The assembly base (30) supports the picker system (32). The first mover (28A) is secured to the assembly base (30), and selectively moves along the first rack (20A). The second mover (28B) is also secured to the assembly base (30), and selectively moves along the second rack (20B). The second mover (28B) is spaced apart from the first mover (28A). The control system (26) controls independent movement of the first mover (28A) and the second mover (28B) to position the assembly base (30) relative to the storage media (16).

22 Claims, 13 Drawing Sheets

(56) References Cited

U.S. PATENT DOCUMENTS

| | | | | |
|---|---|---|---|---|
| 7,349,175 | B2* | 3/2008 | McIntosh | G11B 15/6835 |
| | | | | 360/91 |
| 7,639,573 | B2* | 12/2009 | Steinhilber | G11B 17/225 |
| | | | | 369/30.45 |
| 8,276,168 | B2* | 9/2012 | Todd | G11B 15/6835 |
| | | | | 369/30.45 |
| 8,488,269 | B2* | 7/2013 | Okumura | G11B 15/6885 |
| | | | | 360/92.1 |
| 8,615,322 | B2* | 12/2013 | Thompson | G11B 15/6835 |
| | | | | 414/273 |
| 8,675,302 | B2* | 3/2014 | Hashimoto | G11B 15/6835 |
| | | | | 360/92.1 |
| 9,196,290 | B2* | 11/2015 | Hashimoto | G11B 15/6835 |
| 9,202,507 | B1* | 12/2015 | Krick | G11B 15/6835 |
| 2008/0186614 | A1* | 8/2008 | Kotaki | G11B 17/225 |
| | | | | 360/69 |
| 2013/0294872 | A1* | 11/2013 | Hori | G11B 15/6835 |
| | | | | 414/280 |

* cited by examiner

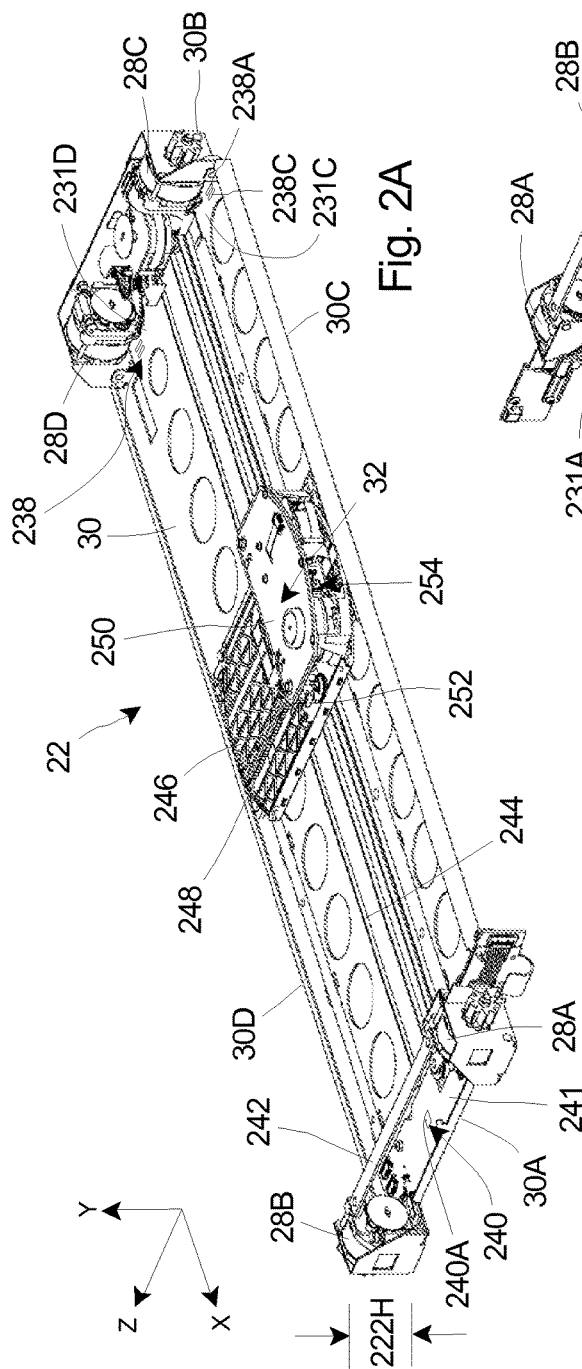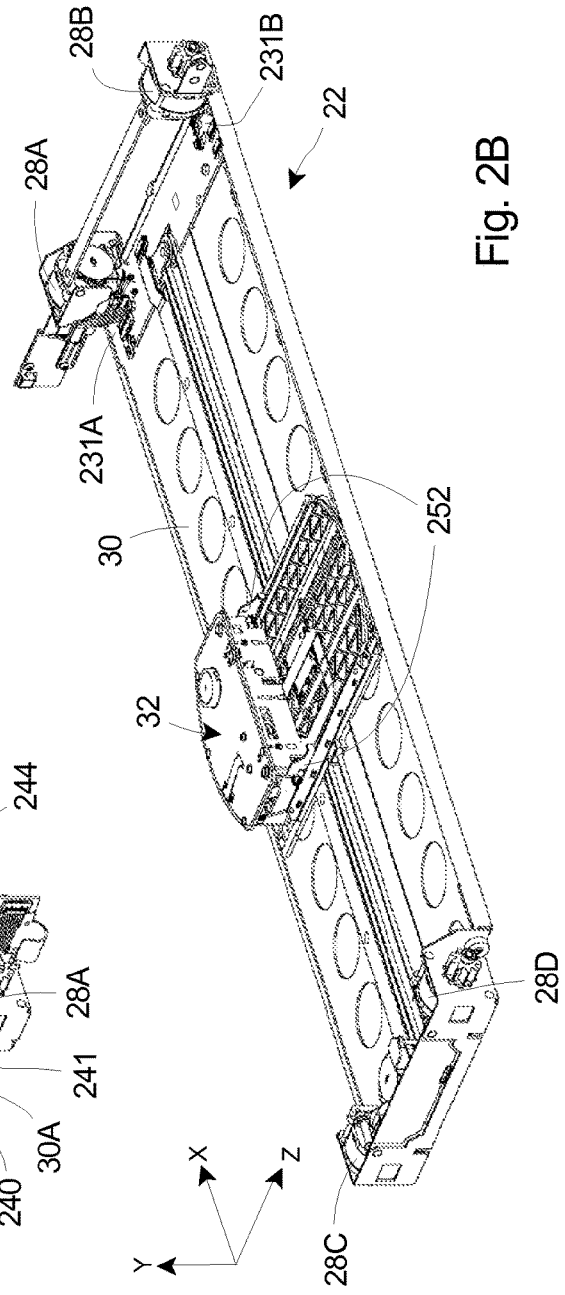

MEDIA LIBRARY INCLUDING STORAGE MEDIA RETRIEVAL ASSEMBLY

BACKGROUND

Magnetic tape has long been used as a storage media for audio, video and computer information. Magnetic tape cartridges have been used extensively because they provide a convenient way to house and support a length of magnetic tape for engagement by a transducer in a tape drive while protecting the tape upon removal of the cartridge. Moreover, magnetic tape cartridges facilitate economic and compact storage of data. With the advent of widespread use of magnetic tape cartridges, the need to provide systems for storage and retrieval of such tape cartridges has resulted in a wide range of automated systems.

Typically, dozens, hundreds or even thousands of tape cartridges are stored within a media library, with each tape cartridge being stored in a particular storage slot in the media library. Responsive to a host computer request, a robotic mechanism, e.g., a robotic storage media retrieval assembly, moves along a rack to physically retrieve an appropriate tape cartridge from its associated storage slot in the media library. The robotic mechanism then moves the tape cartridge to an appropriate device, i.e. a tape drive, and inserts the tape cartridge into the device so that the requested read/write operations can be performed.

In today's world of data storage, and more specifically, storage tape libraries, data storage densities are ever-increasing. The need for greater storage capacities continues to rise, and more solutions are necessary to creatively arrange the mechanical components including tape drives, storage tapes, robotics for moving the storage tapes, cabling, tape magazines, etc., into smaller and smaller spaces within the media library. Because of the greater density of all of this componentry, increased precision is required when it comes to movement of robotics since storage tapes are stored more closely to one another. As a result, there is less free space within the media library for the robotics to sufficiently maneuver in an expeditious manner.

A specific segment of the market has recently turned to the solution of having the media libraries themselves be expandable. In such media libraries, a single robotic mechanism can move through the entire library eliminating the need to provide a separate mechanism for moving cartridges between modular libraries. As the robotic mechanisms grow in size to accommodate larger media libraries, the accuracy of these robotics necessarily must become more exacting.

SUMMARY

The present invention is directed toward a storage media retrieval assembly (also referred to herein simply as a "media retrieval assembly" or a "retrieval assembly") for moving storage media within a media library. In certain embodiments, the media library includes a rack assembly having a first rack and a spaced apart second rack. In various embodiments, the retrieval assembly can include a picker system, an assembly base, a first mover, a second mover, and a control system. The picker system selectively engages the storage media. The assembly base supports the picker system. The first mover is secured to the assembly base, and selectively moves along the first rack. The second mover is also secured to the assembly base, and selectively moves along the second rack. The second mover is spaced apart from the first mover. The control system controls independent movement of the first mover and the second mover to position the assembly base relative to the storage media.

As described in detail herein, the retrieval assembly can include a four-motor drive retrieval assembly that eliminates the need for gear trains, bearings, drive shafts and the critical alignments associated with such. The four-motor independent drive nature also allows for some unique media cartridge handling capabilities.

In certain embodiments, the retrieval assembly further comprises a third mover that is secured to the assembly base. The third mover selectively moves along a third rack of the rack assembly, the third mover being spaced apart from the first mover and the second mover. The control system controls independent movement of the third mover to position the assembly base relative to the storage media. Additionally, in some such embodiments, the retrieval assembly also comprises a fourth mover that is secured to the assembly base. The fourth mover selectively moves along a fourth rack of the rack assembly, the fourth mover being spaced apart from the first mover, the second mover and the third mover. The control system controls independent movement of the fourth mover to position the assembly base relative to the storage media.

In some embodiments, the assembly base is substantially rectangular-shaped. In such embodiments, each of the movers can be secured to the assembly base adjacent to a separate corner of the assembly base.

Additionally, in such embodiments, the assembly base can include a first end and an opposed second end. Each of the movers can be independently controlled by the control system such that the first end of the assembly base is moved a different distance than the second end of the assembly base relative to the rack assembly. Further, in such embodiments, the assembly base can include a first side and an opposed second side. Each of the movers can be independently controlled by the control system such that the first side of the assembly base is moved a different distance than the second side of the assembly base relative to the rack assembly. Still further, each of the movers can be independently controlled by the control system such that the assembly base can be twisted relative to the rack assembly.

In certain embodiments, the assembly base includes a base guide that guides movement of the picker system relative to the assembly base.

Additionally, each mover can include a braking system that can be selectively activated to inhibit movement of the mover along the rack assembly.

The present invention is further directed toward a media library, a method for moving a picker system relative to storage media within a media library, and a method for forming a media library.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2A is a top perspective view of an embodiment of a storage media retrieval assembly that can be included as part of the media library;

FIG. 2B is an alternative top perspective view of the storage media retrieval assembly illustrated in FIG. 2A;

DESCRIPTION

Embodiments of the present invention are described herein in the context of a storage media retrieval assembly. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
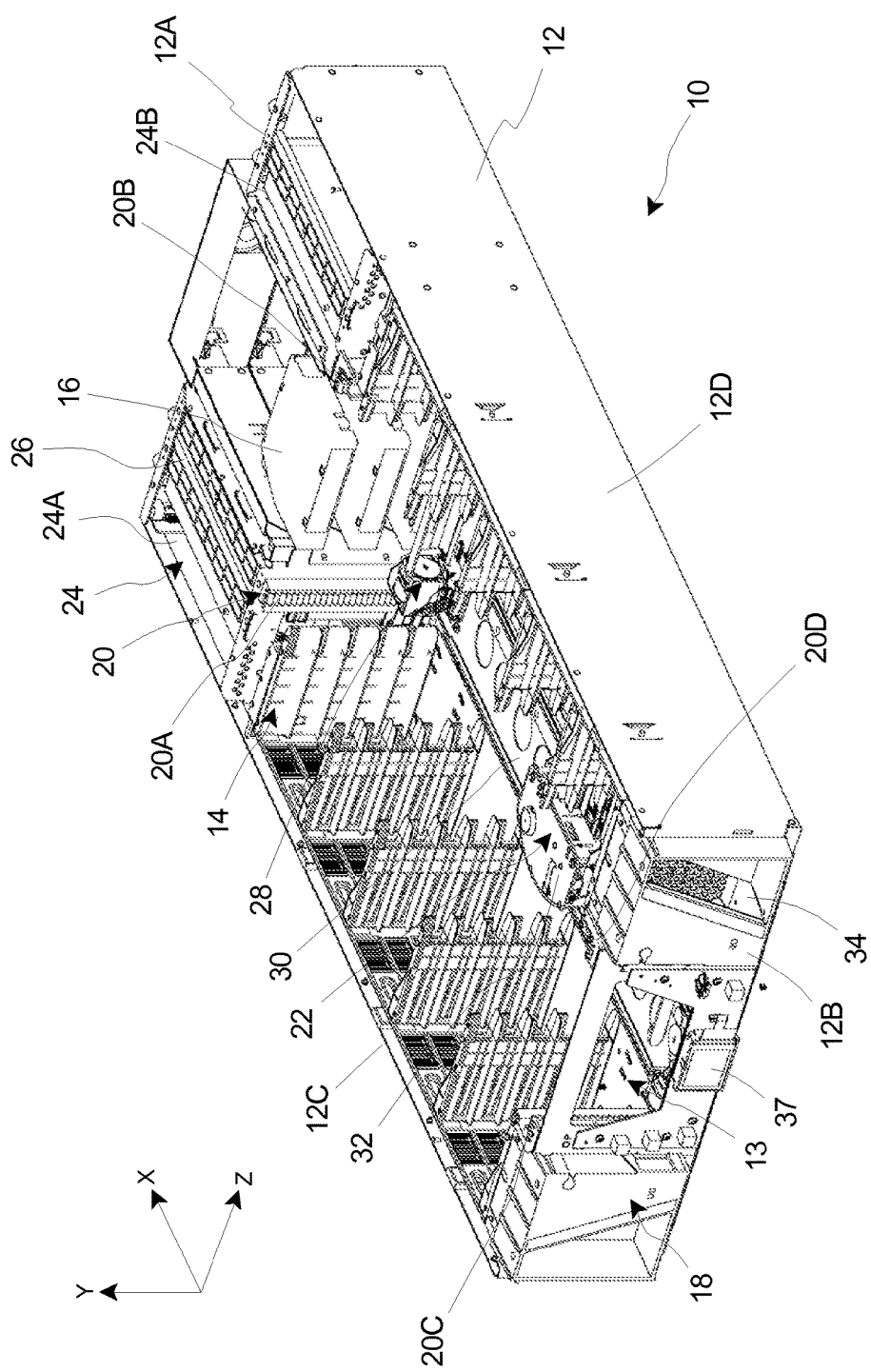
FIG. 1A is a top perspective view of an embodiment of a portion of a media library having features of the present invention, the media library including a library housing.

FIG. 1A is a top perspective view of an embodiment of a portion of a media library 10, e.g., a tape library, having features of the present invention. The design of the media library 10 can be varied as desired. More specifically, it should be noted that the media library 10 illustrated in FIG. 1A is just one non-exclusive example of a media library usable with the present invention, and no limitations are intended based on the specific type and/or size of the media library 10 shown in FIG. 1A. Additionally, although the media library 10 shown and described relative to FIG. 1A is specifically referred to and/or described at times as a tape cartridge library or tape library, it is understood that the present invention is equally applicable for use with any other suitable types of libraries using other types of storage media, such as optical disks, magnetic disk drives, emulated or virtual tape drives, etc., as non-exclusive examples. However, for ease of discussion, FIG. 1A and certain other Figures herein are sometimes described using tape cartridges as the applicable storage media, although this is not intended to restrict or limit the present invention in this manner.

In various embodiments, as illustrated in FIG. 1A, the media library 10 includes (i) a library housing 12 that defines an interior cavity 13; (ii) a plurality of storage slots 14 that are each configured to receive and selectively retain a storage media cartridge 16, e.g., a tape cartridge (sometimes referred to herein simply as "storage media" or "media"); (iii) one or more media drives (not shown in FIG. 1A for purposes of clarity), e.g., tape drives; (iv) a rack assembly 20; (v) a storage media retrieval assembly 22; (vi) a power supply 24; and (vii) a control system 26. Additionally, in FIG. 1A, the library housing 12 is illustrated without a cover for purposes of clarity.

As an overview, as described in detail herein, the media library 10 provides the ability to effectively control the retrieval, movement and usage of the storage media 16 within the media library 10 without the need for gear trains, bearings, drive shafts and the critical alignments that are typically associated with such features. More particularly, in various embodiments, the retrieval assembly 22 includes a plurality of direct-drive movers 28 that are spaced apart from one another and are controlled independently from one another to enable the desired retrieval, movement and usage of the storage media 16 within the media library 10. Further, each of the plurality of movers 28 engages a different portion of the rack assembly 20. With this design, the retrieval assembly 22 is easier to install relative to the rack assembly 20, with no clocking of gears being required. Moreover, the design of the retrieval assembly 22 as provided herein can be lightweight (thereby requiring less power), relatively simple to manufacture and operate (low complexity), and lower in height (with limited overhead required beyond the height of the storage media 16 itself), while still being capable of handling high storage densities.

Additionally, in certain embodiments, as described in greater detail herein below, the media library 10 further includes one or more sensor assemblies to enable better and more precise control of the retrieval, movement and usage of the storage media 16 within the media library 10. Stated in another manner, the one or more sensor assemblies enable better and more precise control of the operation of the retrieval assembly 22. Still further, the media library 10 can also include a low-profile braking system that realizes other benefits as discussed in detail herein below.

Some of the Figures provided herein include an orientation system that designates an X axis, a Y axis that is orthogonal to the X axis, and a Z axis that is orthogonal to the X and Y axes. It should be understood that the orientation system is merely for reference and can be varied. Moreover, it should be noted that any of these axes can also be referred to as a first, a second, and/or a third axis.

The library housing 12 is configured to retain various components of the media library 10. For example, as shown in FIG. 1A, the plurality of storage slots 14, the one or more media drives, the rack assembly 20, the retrieval assembly 22, the power supply 24 and the control system 26 can all be received and retained at least substantially, if not entirely, within the cavity 13 that is defined by the library housing 12. As described herein below, in certain embodiments, the rack assembly 20 can extend beyond the confines of the library housing 12, e.g., above and/or below the library housing 12, by a small amount (e.g., approximately 0.5 millimeters). Additionally, as illustrated in FIG. 1A, the library housing 12 can be rigid and have a substantially rectangular-shaped cross-section, having a first end 12A, an opposed second end 12B, a first side 12C, and an opposed second side 12D. Alternatively, the library housing can have another suitable shape or configuration. For example, the library housing 12 can have a substantially square-shaped or any other suitable shaped cross-section. Further, the library housing 12 may be constructed of any number of conventional materials such as, for example, those utilized in industry standard rack mount cabinets.

In the embodiment shown in FIG. 1A, the plurality of storage slots 14 can be positioned within the library housing 12, with the storage slots 14 being configured to receive and retain the storage media 16. More particularly, with the specific design illustrated in FIG. 1A, each of the storage slots 14 is configured to receive and retain a single storage media cartridge 16. It should be noted that no storage media 16 is shown as being retained within the storage slots 14 in FIG. 1A for purposes of clarity.

In alternative embodiments, the media library 10 can include any suitable number of storage slots 14, and/or the media library 10 can be designed to retain any suitable number of storage media cartridges 16. For example, in the embodiment illustrated in FIG. 1A, the media library 10 includes fifty storage slots 14 arranged in two five-by-five storage areas. More particularly, in this embodiment, the media library 10 includes two magazines 18, one on each side of the retrieval assembly 22, with each magazine 18 including five columns of storage slots 14, and with each column having five storage slots 14 oriented substantially horizontally one on top of another (with limited spacing therebetween). Alternatively, the media library 10 can include greater than fifty or fewer than fifty storage slots 14 and/or the storage slots 14 can be arranged in a different manner than is illustrated in FIG. 1A.

Further, the storage media 16 can include a plurality of tape cartridges, or the storage media 16 can alternatively include a plurality of optical disks, magnetic disk drives, emulated tape drives, etc., as non-exclusive examples.

The one or more media drives are configured for reading and/or writing data with respect to the storage media 16. The number of media drives provided within the media library 10 can be varied to suit the specific requirements of the media library 10. For example, in the embodiment illustrated in FIG. 1A, the media library 10 includes three media drives. Alternatively, the media library 10 can include greater than three or fewer than three media drives. Further, depending on the specific design of the media library 10, the media drives can be adapted for use with different types of media, such as tape cartridges, optical drives, hard disk drives, etc.

It should be appreciated that the media drives are not illustrated in FIG. 1A for purposes of clarity, and so that the storage media 16 can be seen.

The design and configuration of the rack assembly 20 can be varied to suit the specific requirements of the media library 10. For example, in one non-exclusive embodiment, the rack assembly 20 can include four individual racks, i.e. a first rack 20A, a second rack 20B, a third rack 20C, and a fourth rack 20D, that are spaced apart from one another. Additionally, as shown, each rack 20A-20D can be oriented in a generally vertical direction (i.e. along and/or parallel to the Y axis as shown in FIG. 1A) and can extend a height that is sufficient to enable the retrieval assembly 22 to effectively retrieve storage media 16 from any of the plurality of storage slots 14. Alternatively, the rack assembly 20 can include a different number of racks. For example, in some non-exclusive alternative embodiments, the rack assembly 20 can include two racks, three racks or more than four racks that are spaced apart from one another.

It should be appreciated that the use of the terms "first rack", "second rack", "third rack", and "fourth rack" is merely for convenience and ease of illustration, and any of the racks 20A-20D can be referred to as the "first rack", "second rack", "third rack", or "fourth rack".

The media storage retrieval assembly 22 selectively, e.g., upon request of a user, retrieves and moves the storage media 16 as desired between the storage slots 14 and the media drives. As provided herein, in certain embodiments, the retrieval assembly 22 can be relatively lightweight, thereby limiting the overall power requirements for moving and operating the retrieval assembly 22. For example, in some such embodiments, the retrieval assembly 22 can weigh less than approximately 1.18 kilograms (or 2.6 pounds) without taking into consideration the weight of the storage media 16.

It should be appreciated that although a single retrieval assembly 22 is illustrated in FIG. 1A, the media library 10 can be designed to include more than one such retrieval assembly 22. For example, in one non-exclusive alternative embodiment, the media library 10 can include two retrieval assemblies to function in different portions of the media library 10 and/or to provide redundancy in the event that one of the retrieval assemblies fails.

The design of the retrieval assembly 22 can be varied to suit the specific requirements of the media library 10. In some embodiments, as illustrated, the retrieval assembly 22 includes an assembly base 30, the plurality of movers 28, and a picker system 32.

Figure 1B:
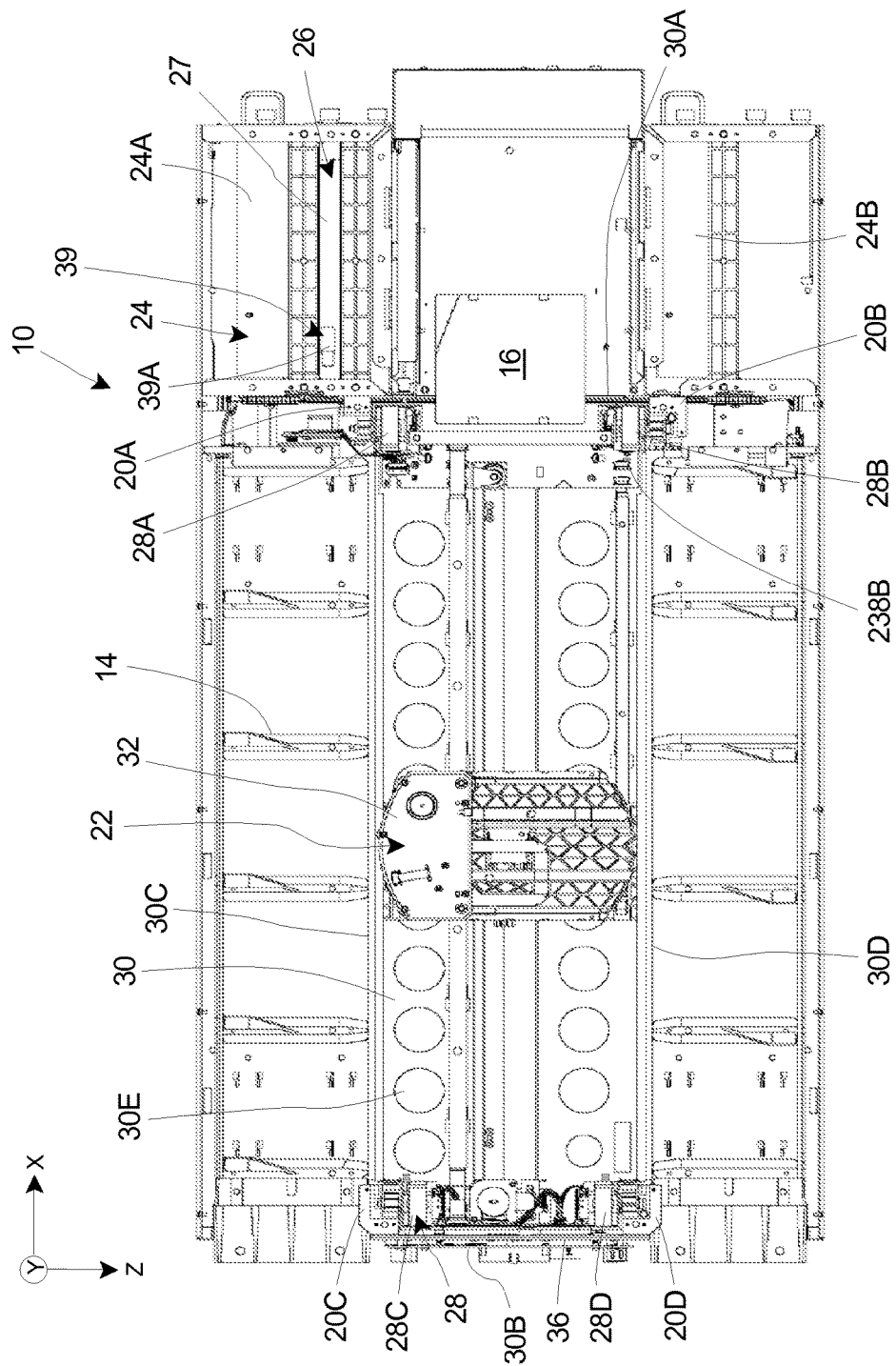
FIG. 1B is a top view of the portion of the media library illustrated in FIG. 1A.

Referring now to FIG. 1B, this Figure is a top view of the portion of the media library 10 illustrated in FIG. 1A. In particular, FIG. 1B more clearly illustrates the overall design and positioning of the retrieval assembly 22 relative to the remainder of the media library 10.

The design of the assembly base 30 can be varied. As shown in this embodiment, the assembly base 30 can be a substantially rectangular-shaped plate having a first end 30A, an opposed second end 30B, a first side 30C and an opposed second side 30D. Additionally, as shown, the assembly base 30 can include a plurality of apertures 30E so as to limit the overall weight of the assembly base 30 without sacrificing desired strength and stability. With this design, as shown in FIG. 1B, the assembly base 30 can assist in providing accurate positioning of the plurality of movers 28 relative to the rack assembly 20. More specifically, in this embodiment, the retrieval assembly 22 can include four movers 28, with one mover 28 being secured to and/or positioned adjacent to each of the corners of the assembly base 30. Alternatively, the assembly base 30 can be designed with a different shape.

The assembly base 30 can be formed from any suitable materials. For example, in one non-exclusive embodiment, the assembly base 30 can be formed from sheet metal that provides desired stiffness in the get/put direction. Additionally, the assembly base 30 can be sufficiently thin to be compliant in different movement directions when such movement may be required to enable proper positioning of the picker system 32 and/or proper leveling of the retrieval assembly 22. The assembly base 30 can also provide heat sinking to dissipate any heat that may be generated from the operation of the movers 28 that are secured thereto. Alternatively, the assembly base 30 can be formed from other suitable materials. For example, in one such alternative embodiment, the assembly base 30 can be formed from aluminum.

The plurality of movers 28 operate to move the assembly base 30, and thus the picker system 32, in the Y direction, e.g., vertically up and down, along the rack assembly 20. As noted, in the embodiment illustrated in FIG. 1B, the retrieval assembly 22 includes four movers, i.e. a first mover 28A, a second mover 28B, a third mover 28C and a fourth mover 28D. Alternatively, the retrieval assembly 22 can include a different number of movers 28, i.e. two movers 28, three movers 28, or more than four movers 28.

Moreover, it should be appreciated that the retrieval assembly 22 can function even if fewer than the illustrated four movers 28 are functioning. As such, the additional movers 28, i.e. more than two, can be provided for purposes of redundancy (i.e. in case one or more movers fail), as well as helping to provide smoother and more reliable movement of the assembly base 30.

As shown, each of the movers 28A-28D is positioned to engage and selectively move along (i.e. in the Y direction) one of the racks 20A-20D of the rack assembly 20. More specifically, in this embodiment, (i) the first mover 28A is positioned to engage and selectively move along the first rack 20A; (ii) the second mover 28B is positioned to engage and selectively move along the second rack 20B; (iii) the third mover 28C is positioned to engage and selectively move along the third rack 20C; and (iv) the fourth mover 28D is positioned to engage and selectively move along the fourth rack 20D.

Additionally, each mover 28A-28D is operated independently of each of the other movers 28A-28D. With this design, the retrieval assembly 22 operates as a four-wheel independent drive system for movement in the Y direction (e.g., up and down). Thus, each corner of the assembly base 30 has its own direct drive mover 28A-28D, with no backlash, no inertia build-up, and no critical alignment gear-to-gear in a drivetrain.

Further, the independent control of each of the movers 28A-28D enables the retrieval assembly 22 to tip and/or tilt the assembly base 30, and thus the picker system 32, out of plane (relative to horizontal) if needed to help move storage media 16 to and from the tape drives and/or storage slots 14 (also known as "get/puts"). More specifically, if and when needed, the movers 28A-28D can tip and/or tilt the assembly base 30 from front to rear (i.e. with the first end 30A being moved a different distance than the second end 30B), and from side to side (i.e. with the first side 30C being moved a different distance than the second side 30D). Additionally, such design further allows for twisting of the assembly base 30 if necessary to accurately and precisely remove and/or insert the storage media 16 out of or into one of the storage slots 14 or one of the media drives.

Moreover, such independent control of each of the movers 28A-28D can also be valuable during an inventory process within the media library 10, e.g., during initialization and/or after a magazine 18 has been removed and reinserted into the media library 10. In particular, the picker system 32 can include a media scanner (not shown), e.g., a barcode scanner, that reads an identifier (not shown), e.g., a barcode, which can be coupled to the storage media 16. If the media scanner is unable to effectively read the identifier on the storage media 16, the picker system 32 can be moved as necessary, i.e. by adjusting the position and/or orientation of the assembly base 30, such that accurate reading of the identifier and thus recognition of the storage media 16 can be accomplished.

Still further, the use of the plurality of movers 28 can also inhibit any sagging or drooping of the assembly base 30 that may otherwise occur within a one-motor system.

It should be appreciated that the use of the terms "first mover", "second mover", "third mover", and "fourth mover" is merely for convenience and ease of illustration, and any of the movers 28A-28D can be referred to as the "first mover", "second mover", "third mover", or "fourth mover".

As illustrated, the picker system 32, e.g., a robotic picker system, is coupled to the assembly base 30 and moves along the assembly base 30 (i.e. in the X direction) so as to be able to effectively access any of the storage slots 14. The design and operation of the picker system 32 will be described in greater detail herein below.

During use, upon receiving a signal from the control system 26 to access a certain storage media 16, the movers 28A-28D can independently move along the respective racks 20A-20D so that the assembly base 30, and thus the picker system 32, are at an appropriate height to access the requested storage media 16. Further, the picker system 32 can move along the assembly base 30 to an appropriate position, and pivot in either direction such that the picker system 32 can physically retrieve the requested storage media 16 from its associated storage slot 14 in the media library 10. Subsequently, the picker system 32 moves the storage media 16 to an appropriate media drive, and inserts the storage media 16 into the media drive so that the requested read/write operations can be performed. Upon completion of the requested read/write operations, the picker system 32 can then return the storage media 16 to an appropriate storage slot 14.

Returning now to FIG. 1A, the power supply 24 provides electrical power in a well-known manner to the one or more media drives, the retrieval assembly 22, the control system 26 and/or additional media libraries 10. The power supply 24 can be interfaced with these components as well as with an external power source in a well-known manner using industry standard cabling and connections. Alternatively, the power supply 24 can be interfaced with these components in another manner.

In certain embodiments, as shown in FIG. 1A, the power supply 24 can include a primary power source 24A and a secondary power source 24B. The primary power source 24A can be configured to provide all necessary power for the media library 10 in most situations. Additionally, the secondary power source 24B can be provided as a back-up source in situations where the primary power source 24A fails or otherwise becomes unavailable, and/or when the primary power source 24A is unable to provide all the power needed to perform the desired operations within the media library 10. The positioning of the power supply 24, i.e. the primary power source 24A and the secondary power source 24B, is also shown in FIG. 1B.

The control system 26 provides the desired and necessary control for all functionality of the media library 10. For example, in certain embodiments, the control system 26 can include a system control board 27 and an assembly control card 241 (illustrated in FIG. 2A). In some applications, the system control board 27 receives commands from a user for accessing and/or moving certain storage media 16. The system control board 27 can subsequently forward such commands to the assembly control card 241 for purposes of accessing and/or moving the storage media 16 as desired with the retrieval assembly 22 and/or the picker system 32. The system control board 27 can further control the media drives for reading and/or writing data with respect to the storage media 16 as desired. Thus, the control system 26, i.e. the system control board 27 and the assembly control card 241, provides the desired and necessary control of the media drives and the retrieval assembly 22, including the independent control of each of the movers 28A-28D of the retrieval assembly 22.

The control system 26 can have any suitable design, many of which are well-known in the industry. For example, in one embodiment, the control system 26 can include a standard driver interface unit for receiving digital commands and translating the commands into driving currents, such as step pulses for controlling stepper motors. Further, the control system 26 can include a standard programmable general purpose computer formed on a single plug-in card unit and can include a programmed microprocessor or microcontroller according to the present invention, memory, communication interface, control interface, connectors, etc. Alternatively, the control system 26 can have a different design and/or the control system 26 can be positioned within the media library 10 in a different position or manner than that illustrated in FIG. 1A.

Additionally, the media library 10 can use well-known industry standard cabling and communication protocols between the control system 26 and other structures of the media library 10. Cabling and electrical characteristics including signaling protocols can be generally standardized, and the logical message protocols can be either proprietary or standardized as known to those skilled in the art.

Additionally, as illustrated in FIG. 1A, the media library 10 can further include one or more handles 34 that are coupled to the library housing 12. For example, the media library 10 can include two handles 34, with one handle 34 being coupled to each magazine 18. The handles 34 can be utilized by a user for individually removing the magazines 18 from within the library housing 12.

Figure 1C:
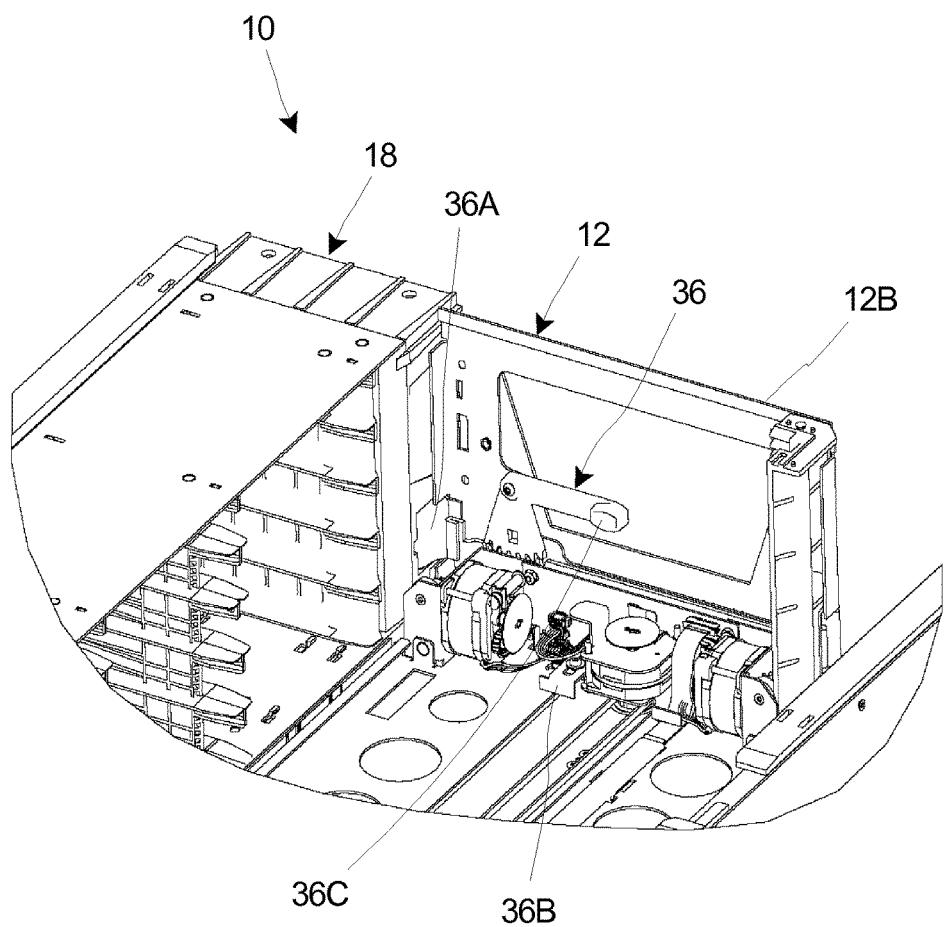
FIG. 1C is an enlarged perspective view of a portion of the media library illustrated in FIG. 1A adjacent a second end of the library housing.

Further, in this embodiment, the retrieval assembly 22, i.e. the picker system 32, can assist the user in removing the magazines 18 from the library housing 12. Referring briefly to FIG. 1C, this Figure is an enlarged perspective view of a portion of the media library 10 illustrated in FIG. 1A adjacent a second end 12B of the library housing 12. In particular, FIG. 1C illustrates portions of a magazine removal system 36 that can be included within the media library 10.

The magazine removal system 36 can have any suitable design. In some embodiments, the picker system 32 (illustrated in FIG. 1A) can be utilized to activate certain mechanical features to release the magazines 18 from the media library 10. For example, in this embodiment, each of the magazines 18 can include a magazine latch 36A that can be utilized to enable the selective removal of the magazine 18 from the media library 10. In order to release the magazine 18, the picker system 32 can be moved so that the picker system 32 contacts and/or pushes on a picker contact area 36B. The movement of the picker contact area 36B from the contact of the picker system 32 causes activation and movement of an actuator bar 36C that extends across the library housing 12 near the second end 12B of the library housing 12. The movement of the actuator bar 36C results in contact with the magazine latch 36A, which in turn pushes the magazine latch 36A into the magazine 18 to thereby release the magazine 18.

Returning again to FIG. 1A, as shown, the media library 10 can also include a display 37, e.g., a touchscreen display, which provides an interface that enables the user to interact with and/or transmit requests to the media library 10.

FIG. 2A is a top perspective view of an embodiment of the storage media retrieval assembly 22 illustrated in FIG. 1A. As provided above, the retrieval assembly 22 includes the assembly base 30, the movers 28A-28D, and the picker system 32. Additionally, FIG. 2A also illustrates each of the movers 28A-28D again being secured to the assembly base 30 adjacent to separate corners of the assembly base 30 to provide the desired independent movement of such corners of the retrieval assembly 22 relative to the racks 20A-20D (illustrated in FIG. 1A) of the rack assembly 20 (illustrated in FIG. 1A).

As provided herein, the independent movement and control of each of the movers 28A-28D with the control system 26 (illustrated in FIG. 1A) enables the desired movement of the assembly base 30 and thus the picker system 32, to effectively access any storage media 16 (illustrated in FIG. 1A) within the media library 10 (illustrated in FIG. 1A). For example, in some situations, the storage media 16, the storage slots 14 (illustrated in FIG. 14) and/or the media drives may be tipped and/or tilted out of level, e.g., in the X direction and/or in the Z direction; and the assembly base 30 can thus be tipped and/or tilted as desired with the four-wheel drive system disclosed herein to still enable the desired access and movement to the requested storage media 16.

More particularly, if the requested storage media 16 (or the storage slots 14 or the media drives) is tipped and/or tilted about the Z axis, the first mover 28A and the second mover 28B can be moved (i.e. under the control of the control system 26) a different distance (more or less) in the Y direction relative to the third mover 28C and the fourth mover 28D. Thus, the assembly base 30 can be tipped and/or tilted as necessary from front to rear, i.e. with the first end 30A being moved a different distance than the second end 30B. An example of the assembly base 30, and thus the remainder of the retrieval assembly 22, being tipped and/or tilted from front to rear is illustrated and described herein below in relation to FIG. 2E.

Additionally, if the requested storage media 16 (or the storage slots 14 or the media drives) is tipped and/or tilted about the X axis, the first mover 28A and the third mover 28C can be moved a different distance (more or less) in the Y direction relative to the second mover 28B and the fourth mover 28D. Thus, the assembly base 30 can be tipped and/or tilted as necessary from side to side, i.e. with the first side 30C being moved a different distance than the second side 30D. An example of the assembly base 30, and thus the remainder of the retrieval assembly 22, being tipped and/or tilted from side to side is illustrated and described herein blow in relation to FIG. 2F.

Further, in certain situations, the first mover 28A and the fourth mover 28D can be moved to different distance (more or less) in the Y direction relative to the second mover 28B and the third mover 28C if it is desired to impart a twisting motion to the assembly base 30.

Additionally, it should be appreciated that the independent control of each of the movers 28A-28D with the control system 26 enables different portions of the assembly base 30 to be positioned independently relative to the storage media 16. For example, (i) a first portion 231A (illustrated in FIG. 2B) of the assembly base 30, e.g., a first corner of the assembly base 30, can be positioned relative to the storage media by controlling movement of the first mover 28A along the first rack 20A with the control system 26; (ii) a second portion 231B (illustrated in FIG. 2B) of the assembly base 30, e.g., a second corner of the assembly base 30, can be positioned relative to the storage media by controlling movement of the second mover 28B, independent of the first mover 28A, along the second rack 20B with the control system 26; (iii) a third portion 231C of the assembly base 30, e.g., a third corner of the assembly base 30, can be positioned relative to the storage media by controlling movement of the third mover 28C, independent of the first mover 28A and the second mover 28C, along the third rack 20C with the control system 26; and (iv) a fourth portion 231D of the assembly base 30, e.g., a fourth corner of the assembly base 30, can be positioned relative to the storage media by controlling movement of the fourth mover 28D, independent of the first mover 28A, the second mover 28B and the third mover 28C, along the fourth rack 20D with the control system 26.

It should be appreciated that in any such situations discussed above, it is possible that each of the movers 28A-28D can be moved a different distance in the Y direction than each of the other movers 28A-28D. With such design, the picker system 32 which rides on the assembly base 30 can effectively access, retrieve and/or insert any requested storage media 16 as desired within the media library 10, even if the storage media 16 (or the storage slots 14 or the media drives) is/are out of plane in any direction.

Additionally, it should also be appreciated that, as disclosed herein, the independent movement and control of the movers 28A-28D also enables the retrieval assembly 22 to return the assembly base 30 to a level and planar position at any desired time.

To better enable the retrieval assembly 22 to effectively position the assembly base 30 in such a level and planar configuration, in certain embodiments, the retrieval assembly 22 can include and/or incorporate a home sensor assembly 238, a shock sensor assembly 39 (illustrated in FIG. 1B), and/or a level sensor assembly 240.

The design of the home sensor assembly 238 can be varied to suit the specific design requirements of the retrieval assembly 22 and/or the media library 10. In certain embodiments, as shown, the home sensor assembly 238 can include a home sensor 238A that is positioned substantially near and/or adjacent to each of the movers 28A-28D. The home sensors 238A can be provided to enhance the ability of the retrieval assembly 22 to have the assembly base 30 return to a "home" position. More particularly, each of the home sensors 238A is able to determine a "home" position for its respective mover 28A-28D relative to the rack assembly 20 and/or a bottom of the library housing 12 (illustrated in FIG. 1A). For example, in some such embodiments, each home sensor 238A can be positioned and oriented to identify a home sensor target 238B (illustrated in FIG. 1B) that can extend through a target slot 238C in the assembly base 30, i.e. when the assembly base 30 is near its "home" position. Thus, in such embodiments, when each of the home sensors 238A effectively identifies its respective home sensor target 238B, the control system 26 knows that each corner of the assembly base 30 (and thus the assembly base 30 as a whole) is at the "home" position.

Moreover, with such a home sensor 238A being associated with each of the movers 28A-28D and each corner of the assembly base 30, the retrieval assembly 22 is able to effectively level itself. More specifically, by ensuring that each of the corners of the assembly base 30 is at its "home" position, i.e. by moving each mover 28A-28D until the home sensor target 238B is effectively identified by the home sensor 238A, the control system 26 can ensure that the assembly base 30 is level. Further, with such design, no clocking or timing is required.

The shock sensor assembly 39 can be included on the system control board 27 (illustrated in FIG. 1B) as part of the control system 26. In certain embodiments, the shock sensor assembly 39 can be used to sense any shocks or vibrations to or within the media library 10. More specifically, in such embodiments, the first level sensor assembly 39 can include a shock sensor 39A (illustrated in FIG. 1B) that can be used to sense any shocks or vibrations to the media library 10. In some such embodiments, the shock sensor 39A can include a three-dimensional accelerometer that is able to sense shocks and vibrations without the use of encoders. More particularly, the control system 26 can interpret the signal or signals from the shock sensor 39A to effectively inhibit such shocks and vibrations from adversely impacting the functioning of the retrieval assembly 22.

In certain embodiments, the level sensor assembly 240 can be used as a back-up to or in conjunction with the home sensor assembly 238. More specifically, in such embodiments, the level sensor assembly 240 can include a level sensor 240A that can be used instead of or in conjunction with the home sensors 238A of the home sensor assembly 238. In some such embodiments, the level sensor 240A can include a three-dimensional accelerometer that is able to sense a "level" position without the use of encoders. More particularly, the control system 26 can interpret the signal or signals from the level sensor 240A to effectively determine if the assembly base 30 is level. The assembly base 30 can then be moved as necessary to accomplish any requested movements with a known starting point with the assembly base 30 being level. Additionally, when such level status is recognized, if any corner of the assembly base 30 (and any mover 28A-28D) is in its "home" position, then each of the four corners of the assembly base 30 (and each of the movers 28A-28D) should be in its "home" position.

Further, in some applications, the level sensor assembly 240, i.e. the level sensor 240A, can also be utilized to sense any shocks or vibrations that may be felt by the retrieval assembly 22.

It should be understood that control features for various aspects of the retrieval assembly 22, including the home sensor 238A and the second level sensor 240A, can be provided on the assembly control card 241. The assembly control card 241 can include any necessary circuitry to provide the desired functionality. In one embodiment, as shown in FIG. 2A, the assembly control card 241 can be provided adjacent the first end 30A of the assembly base 30. Alternatively, the assembly control card 241 can be provided in a different portion of the assembly base 30.

In some embodiments, as shown in FIG. 2A, the retrieval assembly 22 can also include a stabilizer 242, e.g., a stabilizer bar that extends between and couples together the first mover 28A and the second mover 28B. The stabilizer 242 can help stabilize the relationship between the first mover 28A and the second mover 28B, as the first mover 28A and the second mover 28B often move in a similar manner, despite being moved and controlled independently. Additionally, the stabilizer 242 can also be used to lift up and remove the retrieval assembly 22 from the library housing 12 (illustrated in FIG. 1A). Alternatively, the retrieval assembly 22 can be designed without the stabilizer 242.

Figure 2C:
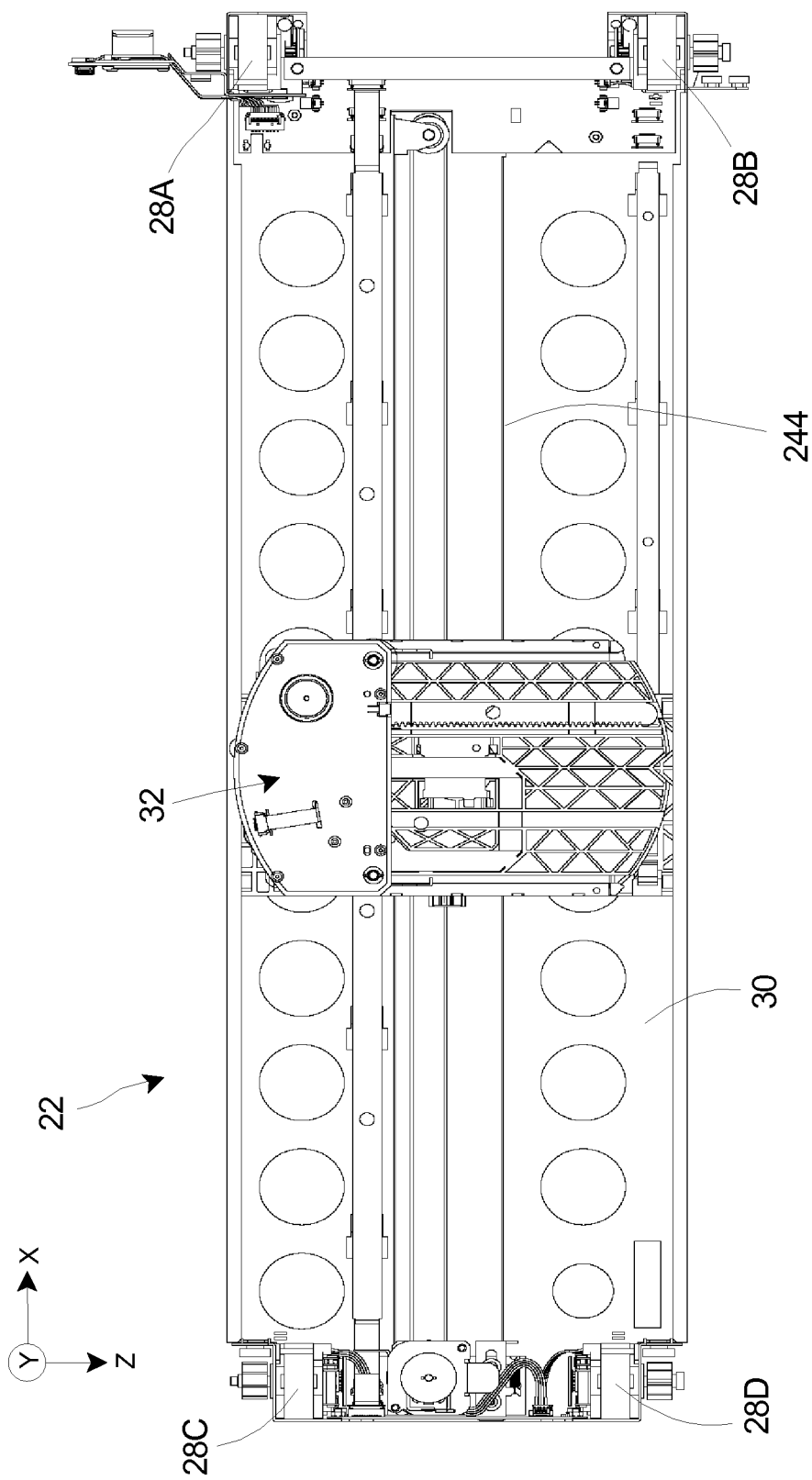
FIG. 2C is a top view of the storage media retrieval assembly illustrated in FIG. 2A.

FIG. 2A further illustrates certain features of the retrieval assembly 22 that enable desired movement of the picker system 32 relative to the assembly base 30. For example, as shown in this embodiment, the assembly base 30 can include one or more base guides 244 (also illustrated more clearly in FIG. 2C) that guide translational movement of the picker system 32 relative to the assembly base 30 in the X direction. Thus, the picker system 32 can move relative to the assembly base 30 in the X direction to move and access the storage media 16 from any storage slots 14 in the media library 10, as well as to and from the media drives.

Additionally, FIG. 2A also illustrates various components of the picker system 32. The design of the picker system 32 can be varied to suit the specific requirements of the retrieval assembly 22. More specifically, the picker system 32 is configured to enable easy retrieval and movement of the storage media 16 (illustrated in FIG. 1A) from and between the storage slots 14 (illustrated in FIG. 1A) and the media drives. As shown in FIG. 2A, in certain embodiments, the picker system 32 includes a picker frame 246 having one or more picker guides 248, a picker body 250, picker fingers 252, and a picker mover assembly 254.

The picker frame 246 supports the picker body 250, the picker fingers 252, and the picker mover assembly 254 relative to the assembly base 30. The picker frame 246 can also help support the storage media 16 during movement of the storage media 16. Additionally, the picker frame 246 includes the one or more picker guides 248 that guide movement of the picker body 250 relative to the picker frame 246 and the assembly base 30 in the X and/or Z direction. In the embodiment illustrated in FIG. 2A, such lateral movement of the picker body 250 can be required to enable the picker system 32 to access and move storage media 16 to or from the storage slots 14 on either side of the retrieval assembly 22.

The picker frame 246 can have any suitable design and can be made from any suitable materials, such as are well-known in the industry.

The picker body 250 provides the desired housing for the picker mover assembly 254. Additionally, the picker fingers 252 are coupled to and cantilever away from the picker body 250. In various embodiments, the picker system 32 can include two picker fingers 252 to more securely retrieve and retain the storage media 16. The two picker fingers 252 are more clearly illustrated in FIG. 2B.

The picker fingers 252 are sized and shaped to easily access and grip the storage media 16 for purposes of removing the storage media 16 from the storage slots 14 and/or the media drives, as well as for inserting the storage media 16 into the storage slots 14 and/or media drives.

The picker mover assembly 254 moves the picker frame 246, the picker body 250, and/or the picker fingers 252 collectively and/or independently as desired under the control of the control system 26 (illustrated in FIG. 1A). The design of the picker mover assembly 254 can be varied to suit the specific requirements of the retrieval assembly 22 and/or the media library 10. For example, the picker mover assembly 254 can include one or more picker movers (not shown) for (i) moving the picker frame 246 (and thus the remainder of the picker system 32) translationally along the base guides 244 in the X direction relative to the assembly base 30; (ii) moving the picker body 250 (and thus the picker fingers 252) laterally along the picker guides 248 in the Z direction relative to the picker frame 246; and (iii) moving the picker body 250 (and thus the picker fingers 252) rotationally about the Y axis relative to the picker frame 246 so that the picker fingers 252 can be oriented as necessary toward the storage slots 14 on either side of the retrieval assembly 22 and/or toward the media drives. Additionally, in some embodiments, the picker mover assembly 254 can also include a finger mover assembly 256 (illustrated in FIG. 2D) for moving the picker fingers 252 relative to the picker body 250 (i.e. extending or retracting) during any requested operations.

It should also be understood that to the extent that the control system 26 is utilized to control the independent movement of the movers 28A-28D of the retrieval assembly 22 relative to the rack assembly 20, and/or to control the operation of the picker system 32, the control system 26 can be considered to form a part of the retrieval assembly 22.

Additionally, as illustrated, the retrieval assembly 22 can have a relatively low assembly height 222H, which requires limited spacing beyond the height of the storage media 16 (illustrated in FIG. 1A) itself. For example, in certain embodiments, the retrieval assembly 22 can have an assembly height 222H of between thirty millimeters (30 mm) and fifty millimeters (50 mm). In one such non-exclusive alternative embodiment, the retrieval assembly 22 can have an assembly height 222H of approximately thirty-six millimeters (36 mm). Alternatively, the retrieval assembly 22 can have an assembly height 222H that is greater than fifty millimeters (50 mm) or less than thirty millimeters (30 mm).

FIG. 2B is an alternative top perspective view of the storage media retrieval assembly 22 illustrated in FIG. 2A. In particular, FIG. 2B illustrates an alternative view of the base assembly 30, the movers 28A-28D and the picker system 32 of the retrieval assembly 22.

FIG. 2C is a top view of the storage media retrieval assembly 22 illustrated in FIG. 2A. More particularly, FIG. 2C illustrates a top view, showing various features and aspects of the base assembly 30, the movers 28A-28D and the picker system 32 of the retrieval assembly 22.

Figure 2D:
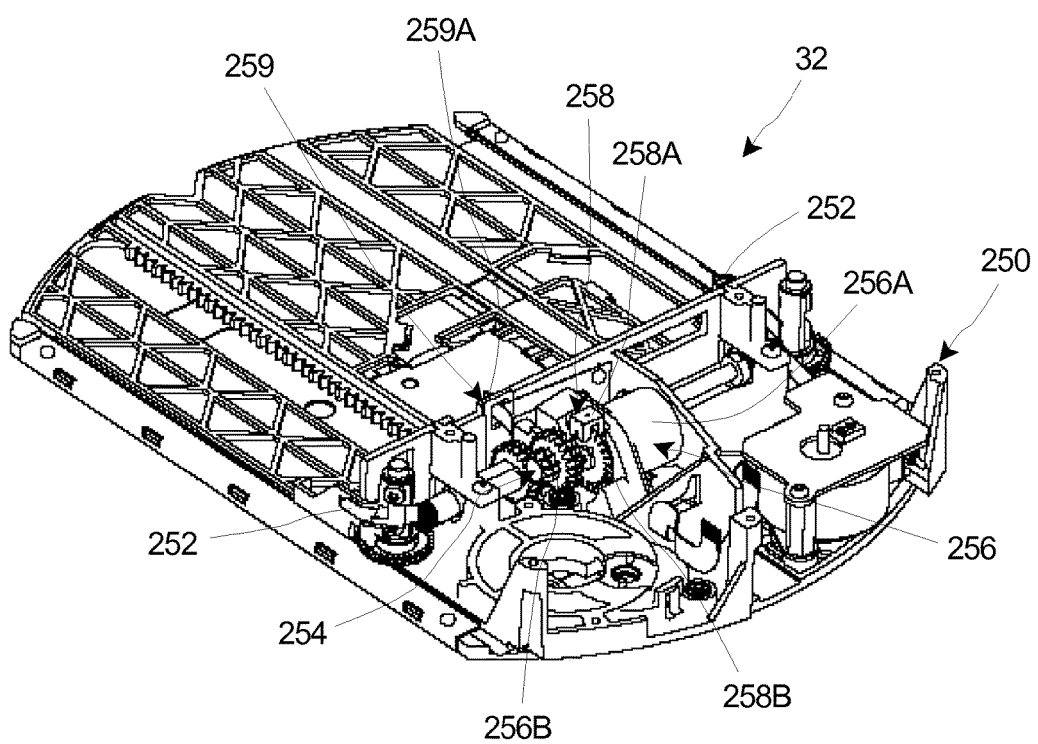
FIG. 2D is a top perspective view of a portion of a picker system that can be included as part of the storage media retrieval assembly of FIG. 2A.

FIG. 2D is a top perspective view of a portion of the picker system 32. In particular, FIG. 2D illustrates certain features and aspects of the picker system 32 that were not clearly illustrated in the preceding Figures. It should be appreciated that a picker control card of the picker body 250 has been omitted in FIG. 2D so that the various features and aspects of the picker system 32 can be more clearly illustrated.

For example, as shown in FIG. 2D, the picker mover assembly 254 can include the finger mover assembly 256 for selectively moving the fingers 252 relative to the picker body 250. More particularly, the finger mover assembly 256 can selectively extend and/or retract the fingers 252 relative to the picker body 250 during any requested movements of the storage media 16 (illustrated in FIG. 1A).

The design of the finger mover assembly 256 can be varied. For example, in the embodiment illustrated in FIG. 2D, the finger mover assembly 256 includes a finger mover 256A and a finger gear assembly 256B. The finger mover 256A can be selectively actuated with the control system 26 (illustrated in FIG. 1A) to drive, e.g., rotate, the finger gear assembly 256B. Additionally, the finger gear assembly 256B is mechanically coupled to each of the fingers 248 such that the rotation of the finger gear assembly 256B causes the fingers 248 to extend away from or retract toward the picker body 250 depending upon the direction of rotation. Alternatively, the finger mover assembly 256 can have a different design.

Additionally, in some embodiments, the picker system 32 can include a picker sensor assembly 258 to enable servo control of the picker fingers 252. More particularly, with the picker sensor assembly 258, the location and orientation of the picker fingers 252 is known at all times.

The design of the picker sensor assembly 258 can be varied to suit the design requirements of the picker system 32. In certain embodiments, as shown in FIG. 2D, the picker sensor assembly 258 includes a picker sensor 258A, e.g., a picker encoder, and a picker sensor target 258B, e.g., an encoder disc. More specifically, in such embodiments, the picker sensor 258A can be coupled to one or both of the picker fingers 252. The picker sensor 258A can employ an optical/transmissive type sensor arrangement, with the picker sensor 258A monitoring movement of the picker sensor target 258B, e.g., with revolutions of the picker sensor target 258B corresponding to distance travelled. Alternatively, the servo control for the picker fingers 248 can be accomplished in another suitable manner.

Such servo control, e.g., with the picker sensor assembly 258, provides several advantages over traditional systems where the position of the picker fingers is only known at the start and end of a scheduled movement (if the desired end position is actually achieved). For example, with the servo control as disclosed herein, the proper locational and angular movement of the picker fingers 252 can be more quickly and easily attained because the picker sensor 258A recognizes the angle of the picker fingers 252 and/or knows if the picker fingers 252 are unsuccessfully positioned to retrieve the requested storage media 16 (illustrated in FIG. 1A). Thus, with such design, the retrieval assembly 22 can function in a much more efficient manner. Additionally, any improper contact between the picker fingers 252 and the storage media 16 can be quickly recognized, so as to allow better recovery in the instance of any mishandling of the storage media 16.

Further, in certain embodiments, the picker system 32, e.g., the picker body 250, can also include a media sensor assembly 259 for accurately sensing the presence of storage media 16 being retained on the picker frame 246 during movement of the storage media 16. In particular, in such embodiments, the media sensor assembly 259 can include an assembly arm 259A that is positioned to come into contact with the storage media 16 when the storage media 16 is being retained and moved by the picker system 32. The media sensor assembly 259 can further include an assembly sensor (not shown), such as an optical sensor, that senses the contact between the assembly arm 259A and the storage media 16. Thus, when such contact is sensed, the control system 26 knows that the storage media 16 is being retained on the picker frame 246. Additionally, during any desired movement of the storage media 16, if such contact between the assembly arm 259A and the storage media 16 is not sensed, the control system 26 recognizes that remedial or corrective action must be undertaken so that the storage media 16 can be effectively retained by the picker system 32.

Figure 2E:
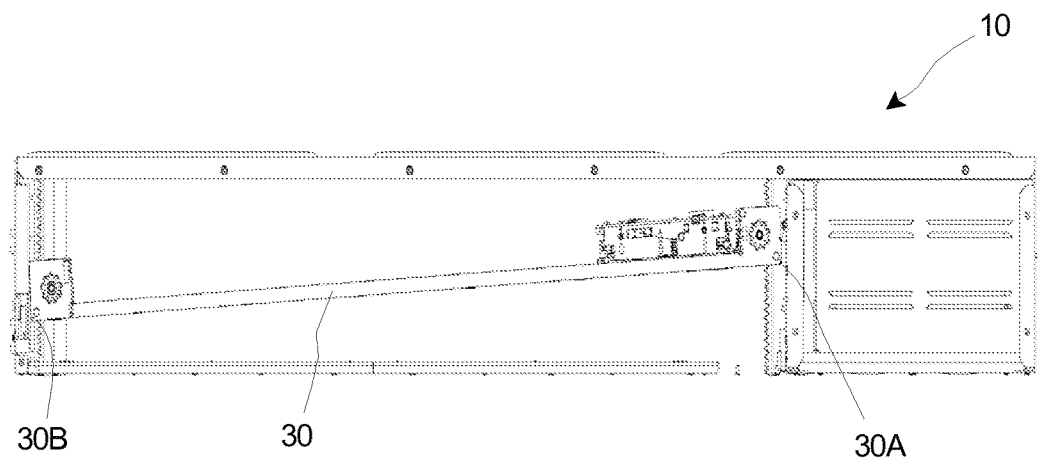
FIG. 2E is a side view of a portion of the media library of FIG. 1A, with the storage media retrieval assembly being tipped from front to rear.

FIG. 2E is a side view of a portion of the media library 10 of FIG. 1A, with the retrieval assembly 22 being tipped from front to rear. More particularly, FIG. 2E illustrates the assembly base 30 being tipped relative to horizontal such that the first end 30A is higher than the second end 30B. As noted, such tipping of the assembly base 30 can be desired to accommodate for potential tipping and/or tilting of the storage media 16 (illustrated in FIG. 1A), the storage slots 14 (illustrated in FIG. 1A) and/or the media drives. Alternatively, it should be appreciated that the assembly base 30 can also be tipped such that the second end 30B is higher than the first end 30A.

Figure 2F:
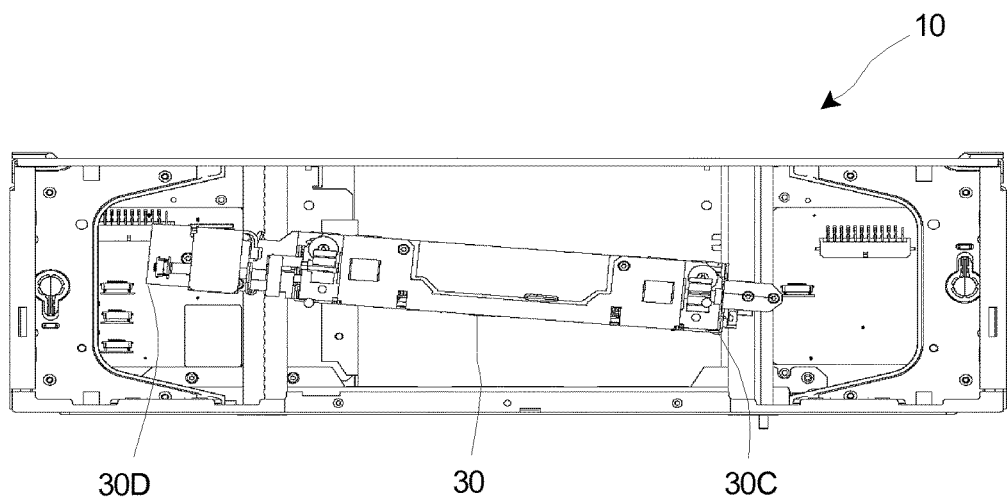
FIG. 2F is an end view of a portion of the media library of FIG. 1A, with the storage media retrieval assembly being tipped from side to side.

FIG. 2F is an end view of a portion of the media library 10 of FIG. 1A, with the retrieval assembly 22 being tipped from side to side. More particularly, FIG. 2F illustrates the assembly base 30 being tipped relative to horizontal such that the second side 30D is higher than the first side 30C. Alternatively, it should be appreciated that the assembly base 30 can also be tipped such that the first side 30C is higher than the second side 30D.

It should be appreciated that the amount of tipping of the assembly base 30 illustrated in FIGS. 2E and 2F has been exaggerated for purposes of illustration. For example, the desired amount of tipping for the assembly base 30 in any given situation to properly access the storage media 16 can be much less than what is shown in FIGS. 2E and 2F.

Figure 3A:
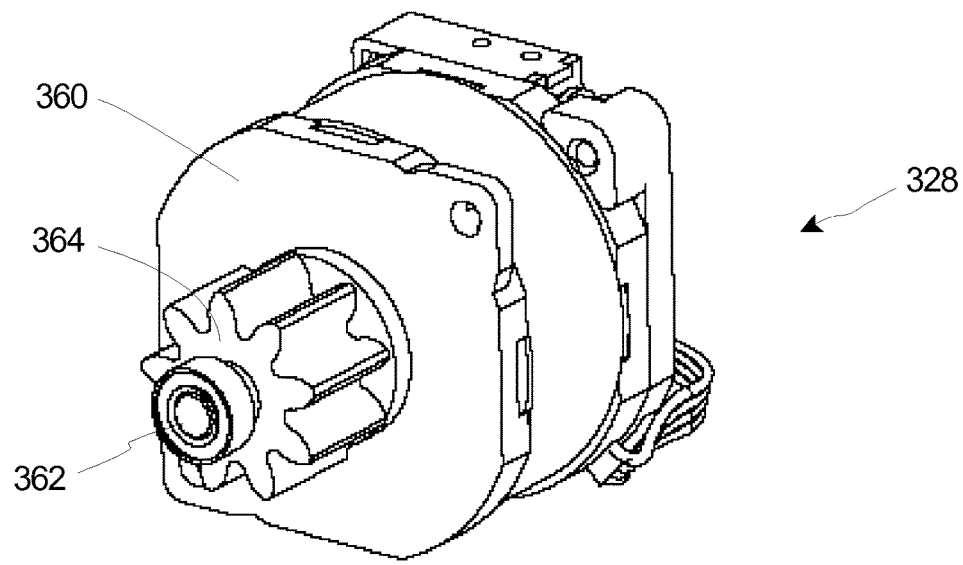
FIG. 3A is a front perspective view of an embodiment of a mover that can be utilized as part of the storage media retrieval assembly.

FIG. 3A is a front perspective view of an embodiment of a mover 328 that can be utilized as part of the storage media retrieval assembly 22 of FIG. 2A. In particular, the mover 328 can function as any of the first mover 28A (illustrated, for example, in FIG. 2A), the second mover 28B (illustrated, for example, in FIG. 2A), the third mover 28C (illustrated, for example, in FIG. 2A), and the fourth mover 28D (illustrated, for example, in FIG. 2A). As such, each of the movers 28A-28D can be substantially similar in design and operation. Stated in another manner, each of the movers 28A-28D can include the same basic components, although the specific shape, positioning and/or orientation of such components can vary as necessary to properly engage and interact with the other components of the media library 10 (illustrated in FIG. 1A). Alternatively, one or more of the movers 28A-28D can have a design that is different than the design of the other movers 28A-28D.

The design of the mover 328 can be varied to suit the specific requirements of the retrieval assembly 22 and/or the media library 10. Additionally, it is recognized that many different types of movers 328 can be utilized within the media library 10, and the illustration and/or description of any one such type is not intended to limit the scope of the present invention in any manner. More specifically, the mover 328 may comprise any controllably positionable electric or non-electric motor. For example, in one non-exclusive embodiment, the mover 328 can comprise a stepper motor. Alternatively, the mover 328 can have a different design known to those skilled in the art. For example, in some such alternative embodiments, the mover 328 can comprise a servo motor, a linear motion device, or a DC motor.

As shown in the embodiment illustrated in FIG. 3A, the mover 328 can include a mover body 360, a drive shaft 362, and a rack engagement gear 364.

The mover body 360 provides a housing to which the other components of the mover 328 can be coupled.

The drive shaft 362 extends through the mover body 360. During use, the drive shaft 362 is selectively rotated under the control of the control system 26 (illustrated in FIG. 1A) to generate the required movement of the mover 328.

As shown, the rack engagement gear 364 is mounted on the drive shaft 362. Additionally, as utilized with the present invention, the rack engagement gear 364 is positioned to engage the rack assembly 20 (illustrated in FIG. 1A). In particular, the rack engagement gear 364 is positioned to engage one of the racks 20A-20D (illustrated in FIG. 1A). The engagement between the rack engagement gear 364 and the rack 20A-20D causes the mover 328 to move relative to the rack 20A-20D, e.g., along the length of the rack 20A-

20D. Thus, when it is desired to move the mover 328 along the rack 20A-20D, the control system 26 provides power to the drive shaft 362 to rotate the drive shaft 362. The rotation of the drive shaft 362 causes the corresponding rotation of the rack engagement gear 364. The rotation of the rack engagement gear 364 causes the mover 328 to selectively move along the rack 20A-20D, i.e. in either direction depending on the direction of rotation of the drive shaft 362.

Figure 3B:
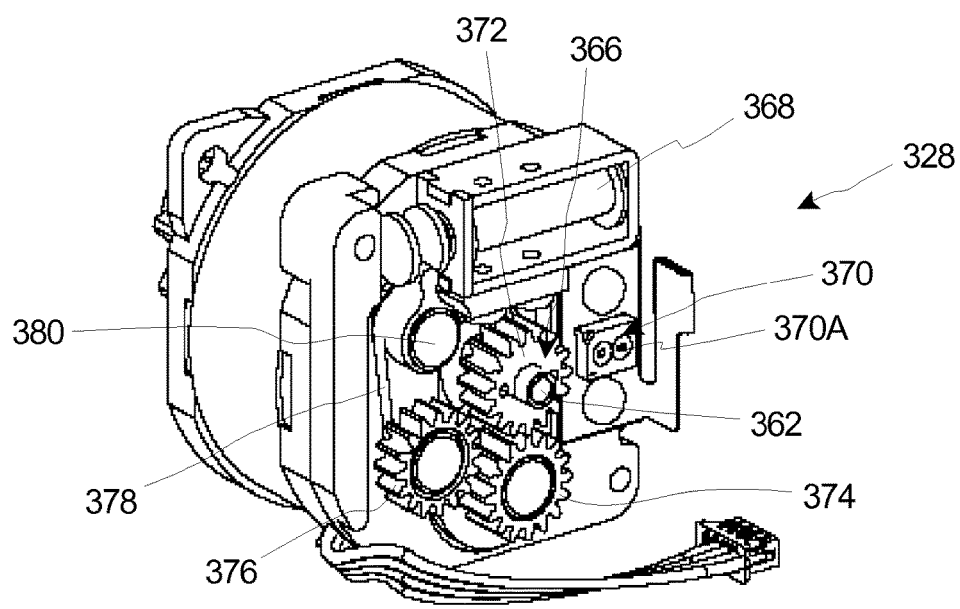
FIG. 3B is a rear perspective view of a portion of the mover illustrated in FIG. 3A.

FIG. 3B is a rear perspective view of the mover 328 illustrated in FIG. 3A. More particularly, FIG. 3B illustrates certain additional features and components of the mover 328. For example, as shown in FIG. 3B, the mover 328 can further include a braking system 366 and a mover location sensor assembly 370.

The braking system 366 provides additional control over the full movement of the mover 328, i.e. along the rack assembly 20 (illustrated in FIG. 1A). It should be appreciated that, as utilized with the present invention, each of the movers 28A-28D (illustrated, for example, in FIG. 2A) can include the braking system 366 to enhance the independent movement and control of each mover 28A-28D.

In certain embodiments, the braking system 366 can be a low-profile braking system where the brakes are engaged, i.e. where movement of the mover 328 is selectively slowed and/or stopped, when the retrieval assembly 22 (illustrated, for example, in FIG. 2A) and/or the media library 10 (illustrated in FIG. 1A) loses power. The design of the braking system 366 can be varied. As illustrated in FIG. 3B, the braking system 366 can include a solenoid 368, a brake drive gear 372, a friction gear 374, an idler gear 376 and a rocker arm 378. Alternatively, the braking system 366 can include more components or fewer components than those specifically illustrated in FIG. 3B.

The solenoid 368 functions as the primary actuator for the braking system 366. More specifically, the solenoid 368 is configured to selectively engage and disengage the braking system 366.

The brake drive gear 372 is mounted on the drive shaft 362. The location of both the rack engagement gear 364 and the brake drive gear 372 on the drive shaft 362 can be seen more clearly in FIG. 3D. With the brake drive gear 372 being mounted on the drive shaft 362, the brake drive gear 372 also rotates during any rotation of the drive shaft 362.

The rocker arm extends from an arm pivot 380 to the idler gear 376. During a loss of power, the solenoid 368 opens and pushes on and moves the rocker arm 378 such that the rocker arm 378 pivots about the arm pivot 380, as shown with arrow 378A (illustrated in FIG. 3D). The rocker arm 378 thus moves the idler gear 376 in the direction of pivot. In particular, as the braking system 366 is being engaged, the rocker arm 378 pivots the idler gear 376 about the arm pivot 380 until the idler gear 376 engages both the friction gear 374 and the brake drive gear 372. The engagement between the idler gear 376 and both the friction gear 374 and the brake drive gear 372 slows and/or stops the rotation of the brake drive gear 372 and, thus, the rotation of the drive shaft 362. As the drive shaft 362 gradually comes to a stop in this manner, the mover 328 will thus be inhibited from moving any further along the rack 20A-20D.

Subsequently, when power is restored, the solenoid 368 closes so that the rocker arm 378 moves (pivots) in the opposite direction. In some such embodiments, the rocker arm 378 can be biased to pivot in the opposite direction thereby disengaging the idler gear 376 from the friction gear 374 and the brake drive gear 372. Thus, the drive shaft 362 is allowed to once again rotate freely so that the mover 328 can again move along the rack 20A-20D as desired.

In certain embodiments, the friction gear 374 can be configured so as to allow manual override of the braking system 366 in the downward direction. Thus, even with the braking system 366 engaged, an operator can manually move the mover 328 down the rack 20A-20D toward its home position by simply pulling downward on the assembly base 30 (illustrated in FIG. 2A). In some such embodiments, the braking system 366, via the friction gear 374, can ratchet in the vertical direction.

The braking system 366 as described herein can provide certain additional advantages for the retrieval assembly 22. For example, in some applications, the braking system 366 can be selectively engaged so as to allow the assembly base 30 to be effectively "parked" at any given time. Such applications can thus require less overall power for the retrieval assembly 22 as the power can be shut off when the assembly base 30 is "parked" as desired. Additionally, the braking system 366 can assist in compensating for shock and vibration scenarios by increasing the holding power of the movers 238. Thus, the braking system 366 can inhibit the mover 328 from slipping along the rack 20A-20D in an undesired manner during such shock and vibration scenarios.

Further, in certain applications, the braking system 366 can provide shock damping if failure, i.e. loss of power, occurs during full speed downward motion. Stated in another manner, the braking system 366 can be designed to enable the idler gear 376 to slip a bit during engagement with the friction gear 374 and the brake drive gear 372 so as to provide a more gradual slowdown of the mover 328. This inhibits totally abrupt stops of the mover 328 along the rack 20A-20D that may otherwise result in damage to the mover 328 and/or the rack 20A-20D.

The mover location sensor assembly 370 keeps track of the location of the mover, i.e. along the rack 20A-20D, at all times. The design of the mover location sensor assembly 370 can be varied. For example, in certain embodiments, the mover location sensor assembly 370 can include a mover location sensor 370A, e.g., an encoder, that monitors revolutions of the mover body 360 relative to the rack 20A-20D. In particular, the mover location sensor 370A can be directed toward a location sensor target 370B (illustrated in FIG. 3C), e.g., an encoder disc, to effectively monitor movement (revolutions) of the mover body 360. Such revolutions of the mover body 360 relative to the rack 20A-20D corresponds with distance travelled by the mover 328 along the rack 20A-20D. By including the mover location sensor 370A on each of the movers 28A-28D (illustrated, for example, in FIG. 2A) of the retrieval assembly 22, the control system 26 can utilize such locational information to help synchronize movement of the four movers 28A-28D. Thus, the control system 26 can more effectively ensure the assembly base 30 remains substantially horizontal as the movers 28A-28D move along the corresponding racks 20A-20D.

In certain embodiments, the mover location sensor 370A can employ an optical/reflective type sensor arrangement. Alternatively, the mover location sensor 370A can employ a different type of sensor arrangement.

Figure 3C:
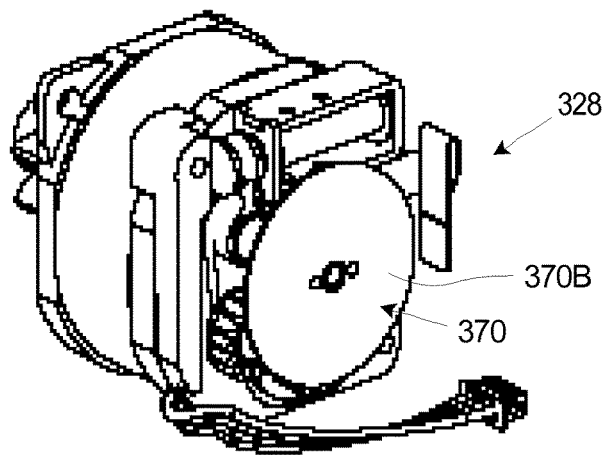
FIG. 3C is another rear perspective view of the mover illustrated in FIG. 3A.

FIG. 3C is another rear perspective view of the mover 328 illustrated in FIG. 3A. More particularly, as noted above, FIG. 3C illustrates the location sensor target 370B that can be utilized as part of the mover location sensor assembly 370.

Figure 3D:
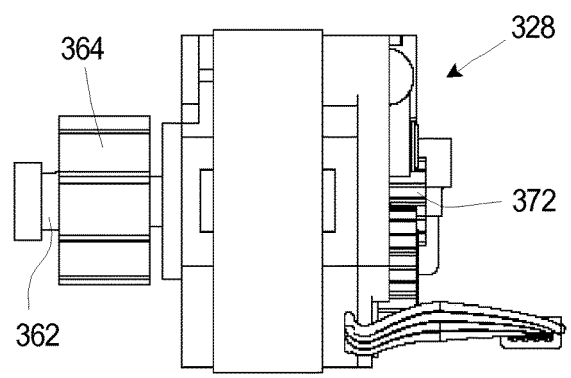
FIG. 3D is a side view of the mover illustrated in FIG. 3A.

FIG. 3D is a side view of the mover 328 illustrated in FIG. 3A. More particularly, FIG. 3D illustrates more clearly certain features and aspects of the mover 328. For example, as noted above, FIG. 3D more clearly illustrates both the rack engagement gear 364 and the brake drive gear 372 being mounted on the drive shaft 362.

Figure 3E:
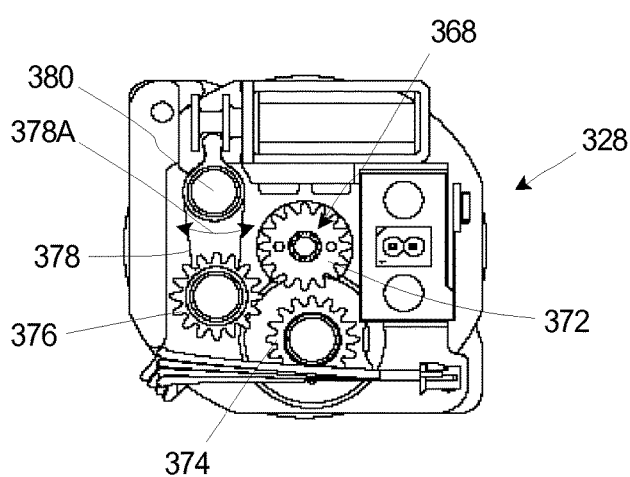
FIG. 3E is a rear view of the mover illustrated in FIG. 3A.

FIG. 3E is a rear view of the mover 328 illustrated in FIG. 3A. As noted above, FIG. 3E illustrates, via arrow 378A, the movement of the rocker arm 378 about the arm pivot 380 as the braking system 368 is being engaged and disengaged. More specifically, FIG. 3E illustrates the selective movement of the idler gear 376 toward the brake drive gear 372 and the friction gear 374 during engagement of the braking system 368, and away from the brake drive gear 372 and the friction gear 374 during disengagement of the braking system 368.

Figure 4A:
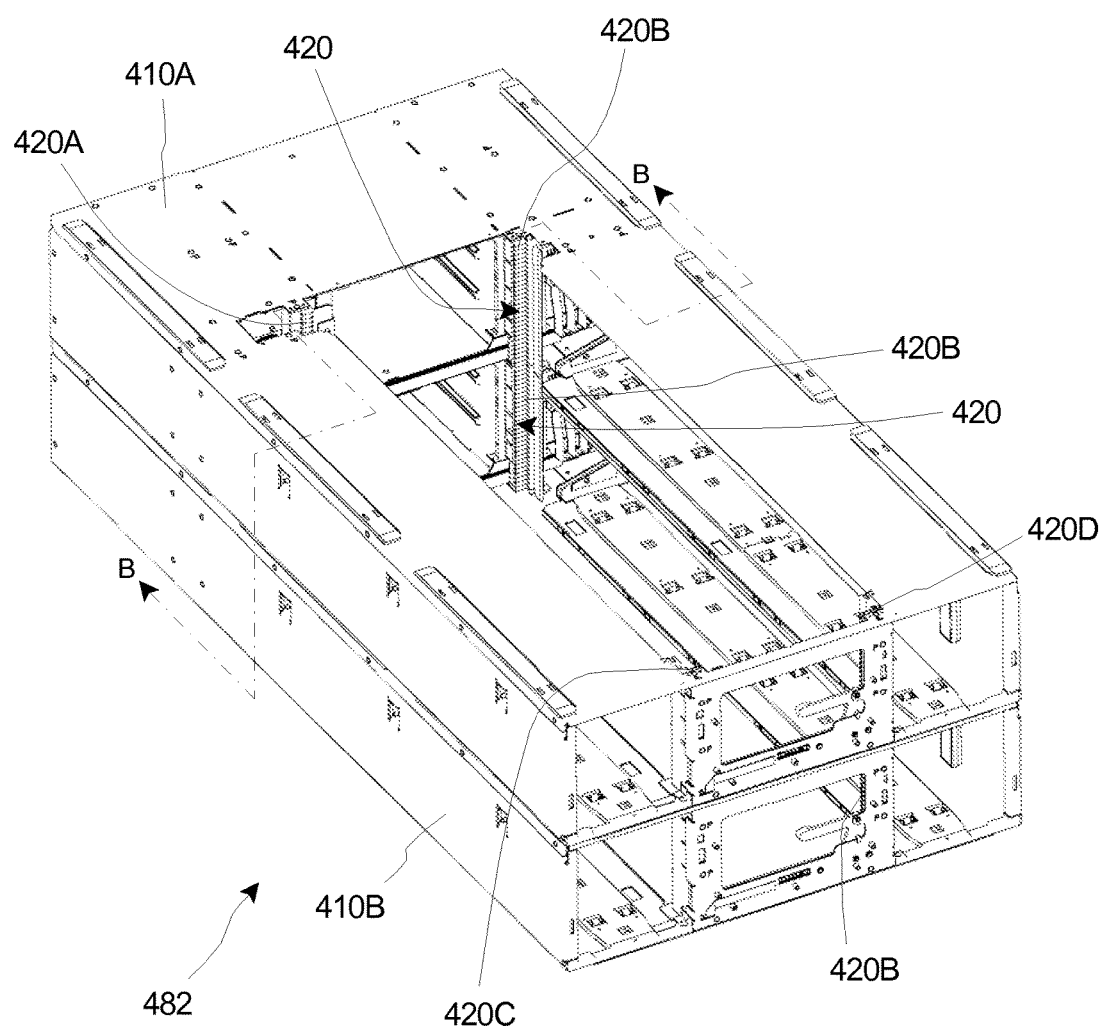
FIG. 4A is a perspective view of a portion of an embodiment of a media library assembly having features of the present invention, the media library assembly including a first media library and a second media library.

FIG. 4A is a top perspective view of a portion of an embodiment of a media library assembly 482 having features of the present invention. The media library assembly 482 includes a first media library 410A and a second media library 410B that are substantially similar to the media library 10 illustrated in FIG. 1A. More specifically, as shown in FIG. 4A, the first media library 410A and the second media library 410B are stacked one on top of the other so as to provide a media library assembly 482 having twice the storage capacity as each of the individual media libraries 410A, 410B. It should be appreciated that, in alternative embodiments, the media library assembly 482 can include greater than two media libraries that are stacked on top of one another.

As described in detail herein below, the media libraries 410A, 410B are configured to be easily stackable relative to one another. In particular, as shown, each of the media libraries 410A, 410B includes a rack assembly 420 having four racks 420A-420D (not all of the racks 420A-420D in each media library 410A, 410B are clearly visible in FIG. 4A) that are spaced apart from one another. Moreover, the racks 420A-420D from the first media library 410A are stacked and aligned directly on top of the racks 420A-420D from the second media library 410B, with no gaps therebetween and such that the pitch of the racks 420A-420D is properly aligned with the adjacent racks 420A-420D. Stated in another manner, in this embodiment, (i) the first rack 420A of the first media library 410A is stacked directly on top of (in direct contact), in alignment with, and on pitch with the first rack of the second media library 410B; (ii) the second rack 420B of the first media library 410A is stacked directly on top of (in direct contact), in alignment with, and on pitch with the second rack 420B of the second media library 410B; (iii) the third rack 420C of the first media library 410A is stacked directly on top of (in direct contact), in alignment with, and on pitch with the third rack of the second media library 410B; and (iv) the fourth rack 420D of the first media library 410A is stacked directly on top of (in direct contact), in alignment with, and on pitch with the fourth rack 420D of the second media library 410B.

It should be appreciated that, with such design, the media library assembly 482 need only include a single retrieval assembly 22 (illustrated, for example, in FIG. 2A), with four movers 28A-28D (illustrated, for example, in FIG. 2A). Each mover 28A-28D can selectively move the full distance along the corresponding rack 420A-420D of both the first media library 410A and the second media library 410B. Stated in another manner, (i) the first mover 28A can selectively move the full distance along the first rack 420A of the first media library 410A and along the first rack of the second media library 410B; (ii) the second mover 28B can selectively move the full distance along the second rack 420B of the first media library 410A and along the second rack 420B of the second media library 410B; (iii) the third mover 28C can selectively move the full distance along the third rack 420C of the first media library 410A and along the third rack of the second media library 410B; and (iv) the fourth mover 28D can selectively move the full distance along the fourth rack 420D of the first media library 410A and along the fourth rack 420D of the second media library 410B.

Additionally, it should also be appreciated that the media library assembly 482 can be configured to include only a single power supply 24 (illustrated in FIG. 1A) and a single control system 26 (illustrated in FIG. 1A), as a separate power supply and control system would not be required for each of the media libraries 410A, 410B.

Figure 4B:
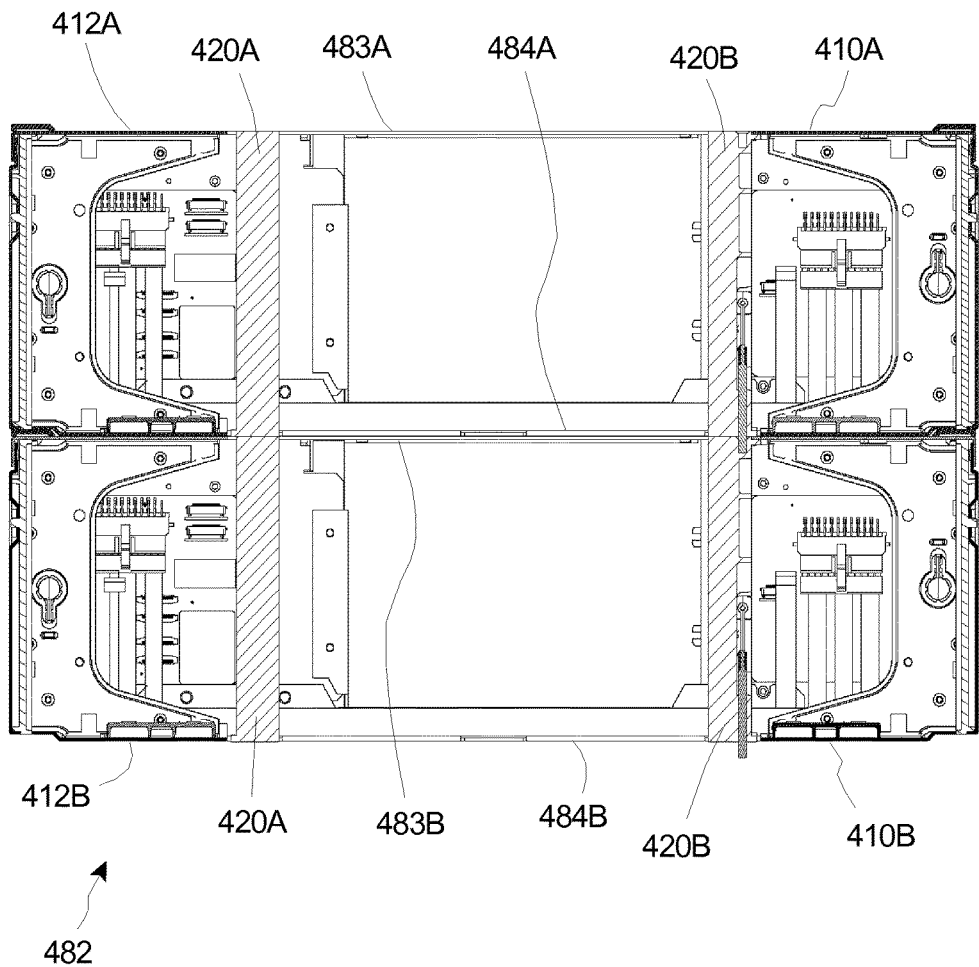
FIG. 4B is a cross-sectional view of the media library assembly taken on line B-B in FIG. 4A.

FIG. 4B is a cross-sectional view of the media library assembly 482 taken on line B-B in FIG. 4A. In particular, FIG. 4B illustrates (i) the first rack 420A of the first media library 410A being stacked and aligned, i.e. on pitch, directly on top of the first rack 420A of the second media library 410B, with no gap therebetween; and (ii) (i) the second rack 420B of the first media library 410A being stacked and aligned, i.e. on pitch, directly on top of the second rack 420B of the second media library 410B, with no gap therebetween.

Additionally, FIG. 4B also illustrates certain features of the racks 420A, 420B for each of the media libraries 410A, 410B that enable such alignment and direct contact between the racks 420A, 420B. For example, in some embodiments, (i) the first rack 420A of the first media library 410A can extend beyond the confines of the first library housing 412A, above a top surface 483A of the first library housing 412A and/or below a bottom surface 484A of the first library housing 412A, by less than approximately one millimeter; and (ii) the first rack 420A of the second media library 410B can extend beyond the confines of the second library housing 412B, above a top surface 483B of the second library housing 412B and/or below a bottom surface 484B of the second library housing 412B, by less than approximately one millimeter. For example, in one non-exclusive embodiment, at least the first rack 420A of the first media library 410A can extend below the bottom surface 484A of the first library housing 412A by approximately 0.5 millimeters.

Somewhat similarly, in some embodiments, (i) the second rack 420B of the first media library 410A can extend beyond the confines of the first library housing 412A, above the top surface 483A of the first library housing 412A and/or below the bottom surface 484A of the first library housing 412A, by less than approximately one millimeter; and (ii) the second rack 420B of the second media library 410B can extend beyond the confines of the second library housing 412B, above the top surface 483B of the second library housing 412B and/or below the bottom surface 484B of the second library housing 412B, by less than approximately one millimeter. For example, in one non-exclusive embodiment, at least the second rack 420B of the first media library 410A can extend below the bottom surface 484A of the first library housing 412A by approximately 0.5 millimeters.

Although it is not shown in FIG. 4B, it should be appreciated that the third racks 420C and the fourth racks 420D of the media libraries 410A, 410B can similarly extend beyond the confines, i.e. the top surfaces 483A, 483B and/or the bottom surfaces 484A, 484B, of the respective library housings 412A, 412B.

Figure 5A:
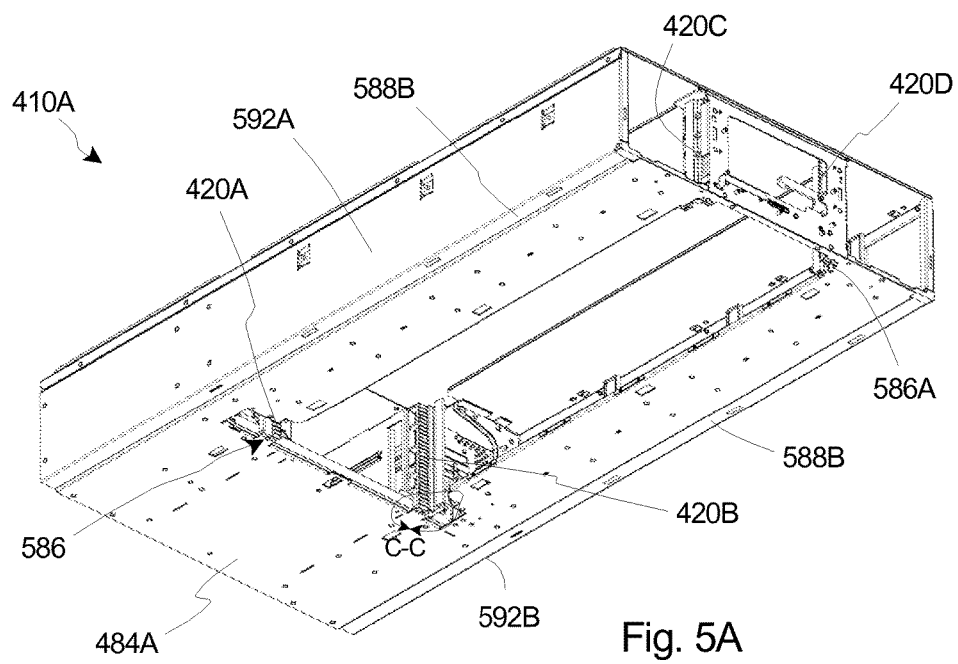
FIG. 5A is a bottom perspective view of the first media library illustrated in FIG. 4A.
Figure 5B:
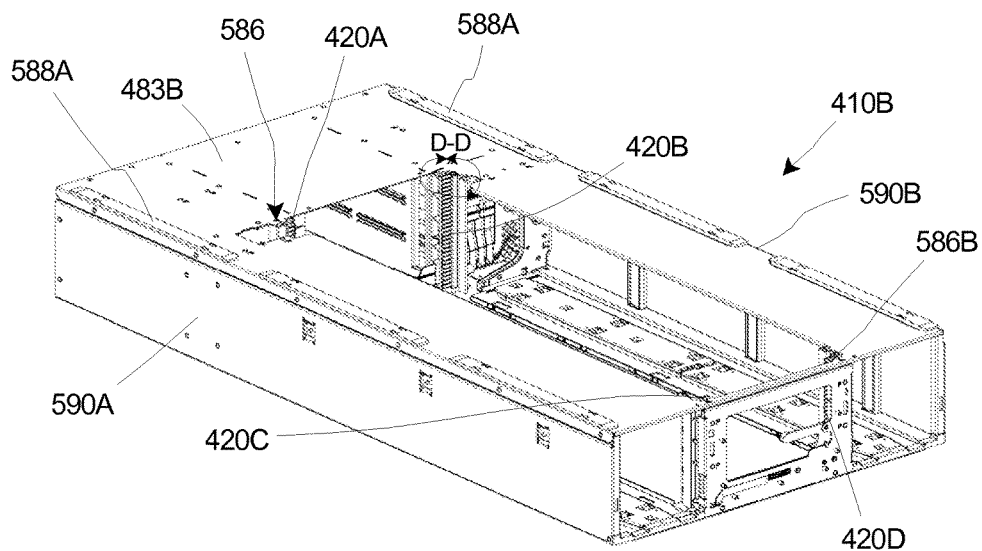
FIG. 5B is a top perspective view of the second media library illustrated in FIG. 4A.

FIG. 5A is a bottom perspective view of a media library, e.g., the first media library 410A illustrated in FIG. 4A. Additionally, FIG. 5B is a top perspective view of a media library, e.g., the second media library 410B illustrated in FIG. 4A. FIG. 5A and FIG. 5B illustrates certain features and aspects of the media libraries 410A, 410B, which help enable the desired alignment of the corresponding racks 420A-420D of the media libraries 410A, 410B on pitch with one another, with no spacing therebetween. More specifically, FIG. 5A and FIG. 5B illustrate various components of an alignment system 586 that helps enable the desired connection between the media libraries 410A, 410B.

The design of the alignment system 586 can be varied to suit the specific requirements of the media library assembly 482 (illustrated in FIG. 4A) and/or the media libraries 410A, 410B. In particular, in certain embodiments, the alignment system 586 can include one or more first aligner members 586A, and one or more second aligner members 586B. The one or more first aligner members 586A can be provided along the bottom surface 484A of the first media library 410A, and the one or more second aligner members 586B can be provided along the top surface 483B of the second media library 410B.

In some such embodiments, the first aligner members 586A can comprise movable, e.g., retractable, alignment pins that when activated can be positioned to cantilever away from the bottom surface 484A of the first media library 410A near one or more of the racks 420A-420D of the first media library 410A; and the second aligner members 586B can comprise alignment apertures that are formed into the top surface 483B of the second media library 410B near one or more of the racks 420A-420D of the second media library 410B. With such design, first media library 410A can be moved relative to the second media library 410B such that the first aligner members 586A, i.e. the alignment pins, can be moved relative to the first library housing 412A so as to extend generally downward into or otherwise engage the second aligner members 586B, i.e. the aligner apertures. Additionally, the racks 420A-420D of the media libraries 410A, 410B can be positioned such that the corresponding racks 420A-420D of each media library 410A, 410B are directly in contact and aligned with one another on pitch when the first aligner members 586A properly engage the second aligner members 586B. Alternatively, the first aligner members 586A can comprise alignment apertures that are formed into the bottom surface 484A of the first media library 410A near one or more of the racks 420A-420D of the first media library 410A; and the second aligner members 586B can comprise retractable alignment pins that can be selectively moved so as to cantilever away from the top surface 483B of the second media library 410B near one or more of the racks 420A-420D of the second media library 410B. Still alternatively, the aligner members 586A, 586B can have a different design and/or the aligner members 586A, 586B can be positioned in a different manner (e.g., away from the racks 420A-420B) than is described herein above.

Additionally, in some embodiments, the alignment system 586 can further include one or more alignment guides 588A and one or more alignment recesses 588B that are positioned to receive the one or more alignment guides 588A. In certain applications, the alignment guides 588A and the alignment recesses 588B can be used for coarse positioning of the media libraries 410A, 410B relative to one another prior to activation of the first aligner members 586A and the second aligner members 586B as described above. In one embodiment, the alignment guides 588A can be formed along the top surface 483B on the second media library 410B, e.g., near opposing sides 590A, 590B of the second media library 410B; and the alignment recesses 588B can be formed into the bottom surface 484A of the first media library 410A, e.g., near opposing sides 592A, 592B of the first media library 410A. As with the aligner members 586A, 586B described above, when the alignment guides 588A are positioned within the alignment recesses 588B, the corresponding racks 420A-420D of each media library 410A, 410B can be directly in contact and aligned with one another on pitch. Alternatively, the alignment guides 588A can be formed along the bottom surface 484A of the first media library 410A and the alignment recesses 588B can be formed into the top surface 483B of the second media library 410B.

Figure 5C:
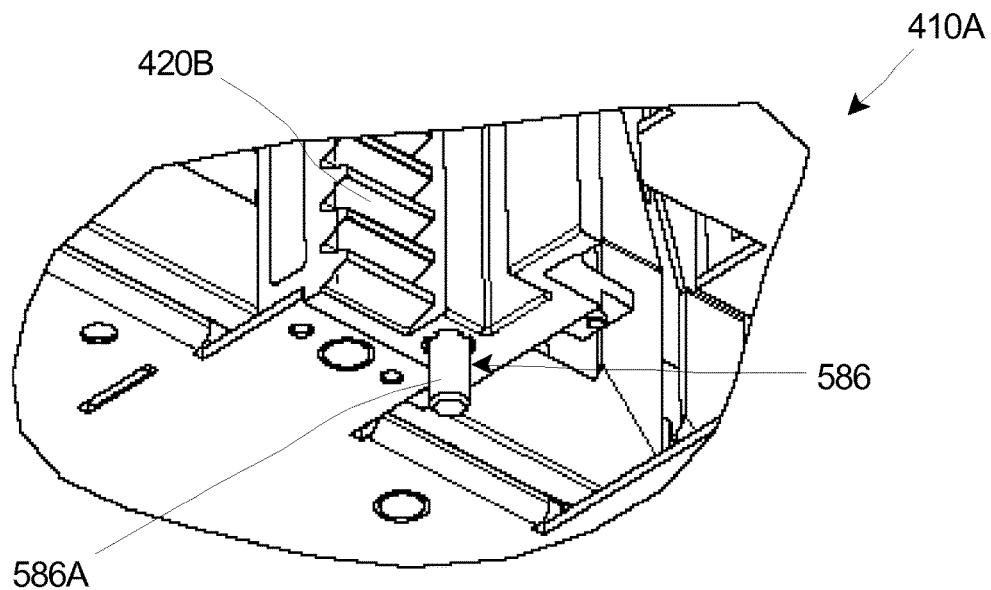
FIG. 5C is an enlarged view of a portion of the first media library outlined by circle C-C in FIG. 5A.

FIG. 5C is an enlarged view of a portion of the first media library 410A outlined by circle C-C in FIG. 5A. In particular, FIG. 5C more clearly illustrates a portion of the second rack 420B of the first media library 410A, and an embodiment of the first aligner members 586A, e.g., retractable alignment pins, that can be utilized as part of the alignment system 586.

Figure 5D:
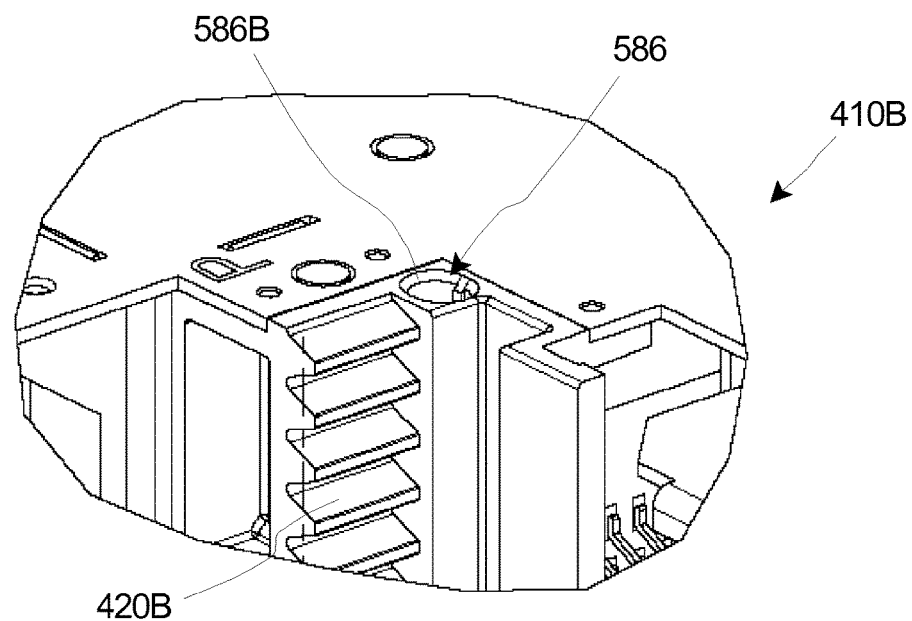
FIG. 5D is an enlarged view of a portion of the second media library outlined by circle D-D in FIG. 5B.

FIG. 5D is an enlarged view of a portion of the second media library 410B outlined by circle D-D in FIG. 5B. In particular, FIG. 5D more clearly illustrates a portion of the second rack 420B of the second media library 410B, and an embodiment of the second aligner members 586B, e.g., alignment apertures, that can be utilized as part of the alignment system 586.

It is understood that although a number of different embodiments of the retrieval assembly 22 have been illustrated and described herein, one or more features of any one embodiment can be combined with one or more features of one or more of the other embodiments, provided that such combination satisfies the intent of the present invention.

While a number of exemplary aspects and embodiments of the retrieval assembly 22 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A retrieval assembly for moving storage media within a media library, the media library including a rack assembly having a first rack and a spaced apart second rack, the retrieval assembly comprising:
    a picker system that selectively engages the storage media;
    an assembly base that supports the picker system, the assembly base being movable along the rack assembly;
    a first mover that is secured to the assembly base, the first mover selectively moving along the first rack;
    a second mover that is secured to the assembly base, the second mover selectively moving along the second rack, the second mover being spaced apart from the first mover; and
    a control system that controls independent movement of the first mover and the second mover to position the assembly base relative to the storage media.

2. The retrieval assembly of claim 1 wherein the assembly base is substantially rectangular-shaped, and wherein each of the movers is secured to the assembly base adjacent to a separate corner of the assembly base.

3. The retrieval assembly of claim 2 wherein the assembly base includes a first end and an opposed second end, and wherein each of the movers can be independently controlled by the control system such that the first end of the assembly base is moved a different distance than the second end of the assembly base relative to the rack assembly.

4. The retrieval assembly of claim 2 wherein the assembly base includes a first side and an opposed second side, and wherein each of the movers can be independently controlled by the control system such that the first side of the assembly base is moved a different distance than the second side of the assembly base relative to the rack assembly.

5. The retrieval assembly of claim 1 further comprising a third mover that is secured to the assembly base, the third mover selectively moving along a third rack of the rack assembly, the third mover being spaced apart from the first mover and the second mover; and wherein the control system controls independent movement of the third mover to position the assembly base relative to the storage media.

6. The retrieval assembly of claim 5 further comprising a fourth mover that is secured to the assembly base, the fourth mover selectively moving along a fourth rack of the rack assembly, the fourth mover being spaced apart from the first mover, the second mover and the third mover; and wherein the control system controls independent movement of the fourth mover to position the assembly base relative to the storage media.

7. The retrieval assembly of claim 6 wherein the assembly base includes a first end and an opposed second end, and wherein each of the movers can be independently controlled by the control system such that the first end of the assembly base is moved a different distance than the second end of the assembly base relative to the rack assembly.

8. The retrieval assembly of claim 6 wherein the assembly base includes a first side and an opposed second side, and wherein each of the movers can be independently controlled by the control system such that the first side of the assembly base is moved a different distance than the second side of the assembly base relative to the rack assembly.

9. The retrieval assembly of claim 6 wherein each of the movers can be independently controlled by the control system such that the assembly base can be twisted relative to the rack assembly.

10. The retrieval assembly of claim 1 wherein the assembly base includes a base guide that guides movement of the picker system relative to the assembly base.

11. The retrieval assembly of claim 1 wherein each mover includes a braking system that is selectively activated to inhibit movement of the mover along the rack assembly.

12. A media library comprising a library housing; a plurality of storage slots; a media drive; storage media; and the retrieval assembly of claim 1 that selectively moves the storage media between the storage slots and the media drive within the library housing.

13. A method for moving a picker system relative to storage media within a media library, the method comprising:
supporting the picker system with an assembly base;
positioning a first portion of the assembly base relative to the storage media by controlling movement of a first mover along a first rack using a control system, the first mover being secured to the assembly base; and
positioning a second portion of the assembly base relative to the storage media by controlling movement of a second mover independent of the first mover along a spaced-apart second rack with the control system, the second mover being secured to the assembly base, the second mover being spaced apart from the first mover.

14. The method of claim 13 further comprising positioning a third portion of the assembly base relative to the storage media by controlling movement of a third mover independent of the first mover and the second mover along a spaced-apart third rack with the control system, the third mover being secured to the assembly base, the third mover being spaced apart from the first mover and the second mover.

15. The method of claim 14 further comprising positioning a fourth portion of the assembly base relative to the storage media by controlling movement of a fourth mover independent of the first mover, the second mover and the third mover along a spaced-apart fourth rack with the control system, the fourth mover being secured to the assembly base, the fourth mover being spaced apart from the first mover, the second mover and the third mover.

16. The method of claim 15 wherein supporting includes the assembly base being substantially rectangular-shaped, and wherein each of the movers is secured to the assembly base adjacent to a separate corner of the assembly base.

17. The method of claim 16 wherein supporting includes the assembly base having a first end and an opposed second end, and wherein each of the movers can be independently controlled by the control system such that the first end of the assembly base is moved a different distance than the second end of the assembly base relative to the rack assembly.

18. The method of claim 16 wherein supporting includes the assembly base having a first side and an opposed second side, and wherein each of the movers can be independently controlled by the control system such that the first side of the assembly base is moved a different distance than the second side of the assembly base relative to the rack assembly.

19. The method of claim 16 wherein each of the movers can be independently controlled by the control system such that the assembly base can be twisted relative to the rack assembly.

20. The method of claim 13 wherein supporting includes the assembly base having a base guide that guides movement of the picker system relative to the assembly base.

21. A method for forming a media library including positioning a plurality of storage slots, a media drive and storage media with a library housing; and selectively moving the storage media between the storage slots and the media drive utilizing the method of claim 13.

22. A retrieval assembly for moving storage media within a media library, the media library including a rack assembly having a first rack, a second rack, a third rack and a fourth rack that are spaced apart from one another, the retrieval assembly comprising:
a picker system that selectively engages the storage media;
an assembly base that supports the picker system, the assembly base being substantially rectangular-shaped, the assembly base including a base guide that guides movement of the picker system relative to the assembly base, the assembly base being movable along the rack assembly;
a first mover that is secured to the assembly base near a first corner of the assembly base, the first mover selectively moving along the first rack to position a first portion of the assembly base along the first rack;
a second mover that is secured to the assembly base near a second corner of the assembly base, the second mover selectively moving along the second rack to position a second portion of the assembly base along the second rack, the second mover being spaced apart from the first mover;
a third mover that is secured to the assembly base near a third corner of the assembly base, the third mover selectively moving along the third rack to position a third portion of the assembly base along the third rack, the third mover being spaced apart from the first mover and the second mover;
a fourth mover that is secured to the assembly base near a fourth corner of the assembly base, the fourth mover selectively moving along the fourth rack to position a fourth portion of the assembly base along the fourth rack, the fourth mover being spaced apart from the first mover, the second mover and the third mover; and a control system that controls independent movement of the first mover, the second mover, the third mover and the fourth mover to position the assembly base relative to the storage media, wherein each mover can be moved a different distance relative to the rack assembly.

* * * * *